US012280008B2

(12) United States Patent
Smith

(10) Patent No.: US 12,280,008 B2
(45) Date of Patent: Apr. 22, 2025

(54) SYSTEMS AND DEVICES FOR TRANSPORTING BIOMATERIALS

(71) Applicant: Cryoport, Inc., Brentwood, TN (US)

(72) Inventor: Steffen Smith, View Park, CA (US)

(73) Assignee: Cryoport, Inc., Brentwood, TN (US)

(*) Notice: Subject to any disclaimer, the term of this patent is extended or adjusted under 35 U.S.C. 154(b) by 111 days.

(21) Appl. No.: 17/889,275

(22) Filed: Aug. 16, 2022

(65) Prior Publication Data

US 2023/0320933 A1 Oct. 12, 2023

Related U.S. Application Data

(60) Provisional application No. 63/328,690, filed on Apr. 7, 2022.

(51) Int. Cl.

| | |
|---|---|
| ***A61J 1/16*** | (2023.01) |
| ***A61J 1/10*** | (2006.01) |
| ***B65D 30/22*** | (2006.01) |
| ***B65D 33/06*** | (2006.01) |
| ***B65D 33/18*** | (2006.01) |

(52) U.S. Cl.

CPC . *A61J 1/16* (2013.01); *A61J 1/10* (2013.01); *B65D 31/12* (2013.01); *B65D 33/065* (2013.01); *B65D 33/18* (2013.01)

(58) Field of Classification Search

CPC .... A61J 1/10; A61J 1/16; B65D 33/18; B65D 33/065; B65D 31/12

USPC ................. 206/204; 220/500–557; 383/6, 38

See application file for complete search history.

(56) References Cited

U.S. PATENT DOCUMENTS

| | | | | |
|---|---|---|---|---|
| 1,719,347 A * | 7/1929 | Weinstein | B65D 33/30 383/905 |
| 3,717,005 A | 2/1973 | McGrew et al. | |
| 3,948,409 A | 4/1976 | Ovchinnikov et al. | |
| 3,955,749 A * | 5/1976 | Turkenkopf | B65D 31/005 229/928 |
| 4,306,425 A | 12/1981 | Sitte et al. | |
| 4,313,558 A | 2/1982 | Benham | |
| 4,411,138 A | 10/1983 | Leithauser et al. | |
| 4,455,842 A | 6/1984 | Granlund | |
| 4,542,826 A | 9/1985 | Adams | |
| 4,572,363 A | 2/1986 | Alpern | |

(Continued)

FOREIGN PATENT DOCUMENTS

| | | |
|---|---|---|
| CN | 2412849 Y | 1/2001 |
| CN | 200794335 U | 10/2018 |

(Continued)

OTHER PUBLICATIONS

USPTO; Non-Final Office Action dated Jan. 1, 2024 in U.S. Appl. No. 17/580,094.

(Continued)

*Primary Examiner* — Chun Hoi Cheung

(74) *Attorney, Agent, or Firm* — Snell & Wilmer L.L.P.

(57) ABSTRACT

A carrying bag can comprise a main body defining an outer sleeve and a top portion; a base portion coupled to the main body via a plurality of tabs; a first handle coupled to the main body; and a top flap extending from the top portion, the top flap including an assembly seal disposed thereon, the top portion configured to fold to close an opening in the top portion, the top flap configured to seal the opening in the top portion via the assembly seal.

20 Claims, 23 Drawing Sheets

(56) References Cited

U.S. PATENT DOCUMENTS

| | | | | |
|---|---|---|---|---|
| 4,694,655 | A | 9/1987 | Seidel et al. | |
| 4,729,494 | A | 3/1988 | Peillon et al. | |
| 4,790,141 | A | 12/1988 | Glascock | |
| 5,566,821 | A | 2/1996 | Brown | |
| 5,954,202 | A | 9/1999 | Mellon | |
| 6,206,194 | B1 | 3/2001 | Beneroff et al. | |
| 6,467,642 | B2 | 10/2002 | Mullens et al. | |
| 6,539,360 | B1 | 3/2003 | Kadaba | |
| 6,913,389 | B2 * | 7/2005 | Kannankeril | B65D 33/20 383/110 |
| 7,627,926 | B2 | 12/2009 | Williams | |
| 7,881,987 | B1 | 2/2011 | Hart | |
| 8,220,107 | B2 | 7/2012 | Williams | |
| 8,371,449 | B2 | 2/2013 | Simon et al. | |
| 8,397,343 | B2 | 3/2013 | Williams | |
| 8,904,810 | B2 | 12/2014 | Schabron et al. | |
| 9,292,824 | B1 | 3/2016 | Freeman | |
| 9,378,442 | B2 | 6/2016 | Barnings | |
| 10,987,276 | B2 | 4/2021 | Mongrenier | |
| 11,124,354 | B2 * | 9/2021 | Waltermire | B65D 81/389 |
| 11,691,788 | B1 | 7/2023 | Smith | |
| 2001/0039807 | A1 | 11/2001 | Mogil | |
| 2002/0099567 | A1 | 7/2002 | Joao | |
| 2002/0102992 | A1 | 8/2002 | Koorapaty | |
| 2002/0119880 | A1 | 8/2002 | Hogberg | |
| 2002/0144926 | A1 | 10/2002 | Rutledge | |
| 2002/0167500 | A1 | 11/2002 | Gelbman | |
| 2003/0137968 | A1 | 7/2003 | Lareau et al. | |
| 2004/0215532 | A1 | 10/2004 | Boman | |
| 2004/0236635 | A1 | 11/2004 | Publicover | |
| 2005/0046584 | A1 | 3/2005 | Breed | |
| 2005/0171738 | A1 | 8/2005 | Kadaba | |
| 2005/0234785 | A1 | 10/2005 | Burman | |
| 2005/0246192 | A1 | 11/2005 | Jauffred et al. | |
| 2006/0080819 | A1 | 4/2006 | McAllister | |
| 2006/0168644 | A1 | 7/2006 | Richter et al. | |
| 2007/0009119 | A1 | 1/2007 | Pohle et al. | |
| 2007/0028642 | A1 | 2/2007 | Glade et al. | |
| 2007/0095722 | A1 | 5/2007 | Messinger | |
| 2007/0268138 | A1 | 11/2007 | Chung et al. | |
| 2008/0094209 | A1 | 4/2008 | Braun | |
| 2008/0162304 | A1 | 7/2008 | Ourega | |
| 2008/0208158 | A1 | 8/2008 | Goodman | |
| 2008/0291033 | A1 | 11/2008 | Aghassipour | |
| 2009/0014537 | A1 | 1/2009 | Gelbman | |
| 2009/0293524 | A1 | 12/2009 | Vezina et al. | |
| 2009/0314835 | A1 | 12/2009 | Jackson | |
| 2010/0025274 | A1 | 2/2010 | Stopek | |
| 2010/0080168 | A1 | 4/2010 | Fukuyama | |
| 2010/0204558 | A1 | 7/2010 | Zocchi | |
| 2010/0299278 | A1 | 11/2010 | Kriss et al. | |
| 2011/0031304 | A1 | 2/2011 | Phillips | |
| 2011/0176749 | A1 | 7/2011 | Race | |
| 2011/0216178 | A1 | 9/2011 | Carpenter | |
| 2014/0144800 | A1 | 5/2014 | Delorme et al. | |
| 2014/0319022 | A1 | 10/2014 | Chu | |
| 2015/0069072 | A1 | 3/2015 | Kelley | |
| 2015/0284145 | A1 | 10/2015 | Arimoto et al. | |
| 2016/0046410 | A1 | 2/2016 | Nakamura | |
| 2016/0229622 | A1 * | 8/2016 | Booska | B65D 81/3893 |
| 2017/0073146 | A1 | 3/2017 | Kuhn | |
| 2019/0119027 | A1 | 4/2019 | Itou et al. | |
| 2019/0175448 | A1 | 6/2019 | Obrad | |
| 2020/0369435 | A1 | 11/2020 | Greenwood et al. | |
| 2021/0315201 | A1 | 10/2021 | McCormick | |
| 2023/0225942 | A1 | 7/2023 | Smith | |
| 2023/0227209 | A1 | 7/2023 | Smith | |
| 2023/0339653 | A1 | 10/2023 | Smith | |
| 2024/0000662 | A1 | 1/2024 | Smith | |

FOREIGN PATENT DOCUMENTS

| | | | |
|---|---|---|---|
| CN | 21025926 | U | 4/2020 |
| EP | 1642749 | A1 | 4/2006 |
| EP | 3409260 | A1 | 12/2018 |
| JP | 2006-051968 | A | 2/2005 |
| JP | 2007-275568 | A | 10/2007 |
| JP | 3958213 | | 5/2018 |
| WO | 1999-058425 | A1 | 11/1999 |
| WO | 2002053967 | | 11/2002 |
| WO | 2007-028647 | A1 | 3/2007 |
| WO | 2008041663 | A1 | 4/2008 |
| WO | 2021-248238 | A1 | 12/2021 |

OTHER PUBLICATIONS

USPTO; Notice of Allowance dated Feb. 17, 2023 in U.S. Appl. No. 17/580,044.

KIPO; International Search Report and Written Opinion dated May 2, 2023 in PCT application No. PCT/US2023/010113.

KIPO; International Search Report and Written Opinion dated Apr. 24, 2023 in PCT application No. PCT/US2022/053024.

USPTO; Non-Final Office Action dated Dec. 2, 2011 in U.S. Appl. No. 12/658,641.

USPTO; Final Office Action dated Aug. 14, 2012 in U.S. Appl. No. 12/658,641.

USPTO; Non-Final Office Action dated Sep. 11, 2015 in U.S. Appl. No. 12/658,641.

USPTO; Non-Final Office Action dated Dec. 11, 2012 in U.S. Appl. No. 12/852,413.

USPTO; Final Office Action dated May 10, 2012 in U.S. Appl. No. 12/852,413.

USPTO; Advisory Action dated Jul. 31, 2012 in U.S. Appl. No. 12/852,413.

USPTO; Non-Final Office Action dated Jun. 18, 2014 in U.S. Appl. No. 12/852,413.

USPTO; Non-Final Office Action dated Jun. 17, 2016 in U.S. Appl. No. 12/852,413.

USPTO; Final Office Action dated Nov. 29, 2016 in U.S. Appl. No. 12/852,413.

USPTO; Non-Final Office Action dated Jul. 25, 2017 in U.S. Appl. No. 14/589,768.

USPTO; Final Office Action dated Feb. 7, 2018 in U.S. Appl. No. 14/589,768.

USPTO; Non-Final Office Action dated Jun. 19, 2018 in U.S. Appl. No. 14/589,768.

USPTO; Final Office Action dated Dec. 27, 2018 in U.S. Appl. No. 14/589,768.

Uspto, Non Final Office Action dated Jul. 10, 2020 in U.S. Appl. No. 15/841,170.

Uspto, Notice of Allowance dated Oct. 30, 2020, in U.S. Appl. No. 15/841,170.

PCT; International Search Report dated May 31, 2002 in International Application No. PCT/US2001/049684.

PCT; International Search Report dated Jun. 28, 2010 in International Application No. PCT/US2010/023252.

PCT; Written Opinion of International Search Authority dated Jun. 28, 2010 in International Application No. PCT/US2010/023252.

PCT; International Preliminary Report on Patentability dated Mar. 22, 2013 in International Application No. PCT/US2010/023252.

PCT; International Search Report & Written Opinion dated Apr. 24, 2019 in PCT Application No. US2018/065509.

PCT; International Preliminary Report on Patentability dated Jun. 16, 2020 in PCT Application No. US2018/065509.

Electronic Reusable Paper, http://www2.parc.com /hsl/projects/gyricon/, (Oct. 2005).

PCT; International Search Report and Written Opinion dated Jun. 29, 2023 for Application No. PCT/US2023/015267.

PCT; International Search Report and Written Opinion of the International Searching Authority dated Oct. 5, 2023 for Application No. PCT/US2023/025748.

PCT; International Preliminary Report on Patentability (IPRP) dated Jul. 23, 2024, 2024 in Application Serial No. PCT/US2023/010113.

PCT; International Preliminary Report on Patentability (IPRP) dated Jul. 23, 2024, 2024 in Application Serial No. PCT/US2022/053024.

(56) References Cited

OTHER PUBLICATIONS

USPTO; Notice of Allowance dated Jun. 12, 2024 in U.S. Appl. No. 18/217,289.
USPTO; Notice of Allowance dated Jun. 13, 2024 in U.S. Appl. No. 17/580,094.
PCT; International Preliminary Report on Patentability (IPRP) dated Oct. 17, 2024 Application Serial No. PCT/US2023/015267.

* cited by examiner

Sect. A-A

SECT A-A

SYSTEMS AND DEVICES FOR TRANSPORTING BIOMATERIALS

CROSS-REFERENCE TO RELATED APPLICATION

This application is a non-provisional of, and claims priority to, and the benefit of U.S. Provisional Application No. 63/328,690, entitled "SYSTEMS AND DEVICES FOR TRANSPORTING BIOMATERIALS," filed on Apr. 7, 2022, which is hereby incorporated by reference in its entirety.

FIELD

This specification relates to a system, device or apparatus for cryogenically storing, transporting and/or shipping a liquid, such as blood, under cryogenic temperatures.

DESCRIPTION OF THE RELATED ART

Medical practitioners or professions may refrigerate or freeze blood for storage and/or transportation to a medical facility. When transporting blood, the blood may be refrigerated and stored in a blood bag. Less-dense blood plasma is often frozen at cryogenic temperatures. At cryogenic temperatures, the blood bags may shatter during transport because the storage devices that store the blood bags are brittle at cryogenic temperatures. Blood bag manufacturers may provide an overwrap bag that is made of material that is more cryogenically friendly, i.e., less brittle, and does not shatter at cryogenic temperatures. The overwrap bag is placed over the blood bag and contains the blood within the blood bag if the blood bag shatters. The overwrap bag, however, does not prevent the blood bag from shattering and does not maintain the integrity and usability of the blood that has been released.

Often, the blood bag is placed into a metallic case for transport. The metallic case holds the blood bag while in storage and during transportation. The metallic case holds the shape of the blood bag and protects the blood bag from external damage, such as cuts and punctures. The metal case, however, does not protect the blood bag from shocks and vibrations. Any impact to the metallic case also causes the blood bag to slide and impact the inner surfaces of the case which may cause the blood bag to become damaged. Additionally, carrying systems for multiple metal cases can become heavy and bulky.

Accordingly, there is a need for a system, device or apparatus to carry a plurality of articles, such as blood bags, that is lighter, easier to load, and easier to ship to an end user.

SUMMARY

A carrying bag is disclosed herein. In various embodiments, the carrying bag comprises: a main body defining an outer sleeve and a top portion; a base portion coupled to the main body via a plurality of tabs; a first handle coupled to the main body; and a top flap extending from the top portion, the top flap including an assembly seal disposed thereon, the top portion configured to fold to close an opening in the top portion, the top flap configured to seal the opening in the top portion via the assembly seal.

In various embodiments, the carrying bag is configured to transition from a shipping configuration to a loading configuration, the shipping configuration including a flattened state, the loading configuration including the opening.

In various embodiments, the base portion includes a base sheet and an absorbent sheet, the plurality of tabs disposed between the base sheet and the absorbent sheet. The plurality of tabs can be coupled to the absorbent sheet via a first manufacturing seal, and wherein the plurality of tabs are coupled to the base sheet via a second manufacturing seal. The absorbent sheet can be coupled to the base sheet via a third manufacturing seal.

In various embodiments, the assembly seal comprises a double sided tape having a first side coupled to the top flap and a second side coupled to a protective layer.

In various embodiments, the carrying bag further comprises a second handle coupled to the main body, the second handle disposed opposite the first handle.

In various embodiments, the main body comprises a first plurality of scores on the top portion and a second plurality of scores on the base portion, and wherein the first plurality of scores are configured to facilitate closing of the opening after loading to transition from the loading configuration to a cryogenic transport configuration. The second plurality of scores can be configured to facilitate folding of the base portion to facilitate shipment of the carrying bag prior to loading by an end user.

In various embodiments, the main body comprises an exterior layer made of a polymeric material, and wherein the main body comprises an absorbent layer disposed on at least a portion of an internal surface of the exterior layer.

A cryogenic articles transport assembly is disclosed herein. In various embodiments, the cryogenic articles transport assembly comprises: a carrying bag including a main body having a top portion, a base portion coupled to the main body, and a first handle coupled to the main body; a partition assembly including a partition sleeve and a plurality of partitions coupled to the partition sleeve; a shipping configuration of the cryogenic articles transport assembly, the shipping configuration including the partition assembly disposed in the carrying bag, the carrying bag and the partition assembly in a flattened state; and a loading configuration of the cryogenic articles transport assembly, the loading configuration including an opening defined at the top portion of the carrying bag and the partition assembly in an extracted state, the extracted state of the partition assembly defining a plurality of slots within the partition assembly configured to receive a cassette with a biomaterial article.

In various embodiments, the cryogenic articles transport assembly is configured to transition from the shipping configuration to the loading configuration in response to applying compressive forces to a first edge of the carrying bag and a second edge of the carrying bag, the first edge disposed on an opposite side as the second edge.

In various embodiments, the cryogenic articles transport assembly is also configured to be in a cryogenic article transport configuration with a plurality of cassettes disposed in the carrying bag, the plurality of cassettes being one of a metal cassette or an envelope.

In various embodiments, the base portion of the carrying bag further comprises a base sheet and an absorbent sheet, and wherein a plurality of tabs are disposed between the base sheet and the absorbent sheet coupling the base sheet and the absorbent sheet to the main body of the carrying bag. The cryogenic articles transport assembly can further comprise a damping component disposed adjacent to the absorbent sheet.

A method of loading a cryogenic articles transport assembly is disclosed herein. In various embodiments, the method comprises: transitioning a carrying bag with a partition assembly disposed therein from a flattened state to a loading configuration, the loading configuration including an opening at a top portion of the carrying bag; loading a plurality of cassettes in the carrying bag, each cassette in the plurality of cassettes disposed in a slot defined by the partition assembly in an extracted state; folding the top portion to close the opening; and sealing the top portion via a top flap extending from the top portion.

In various embodiments, the method further comprises removing a protective layer from a seal on the top flap prior to sealing the top portion via the top flap.

In various embodiments, the method further comprises folding tabs of the top portion inward to further seal the top portion.

In various embodiments, the method further comprises pivoting a bottom portion of the carrying bag about scores defined by a main body of the carrying bag during transitioning of the carrying bag with the partition assembly from the flattened state to the loading configuration. The method can further comprise applying compressive forces to opposite sides of the carrying bag in the flattened state to initiate the transitioning from the flattened state to the loading configuration.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses and devices for transporting and storing an article such as a blood bag. The system, apparatus or device may include a plurality of envelopes ("envelopes") disposed in a sealed bag ("bag") that stores and transports a plurality of articles (such as blood bags) (i.e., each envelope in the plurality of envelopes includes a blood bag in the plurality of bags). Particular embodiments of the subject matter described in this specification may be implemented to realize one or more of the following advantages.

The bags disclosed herein are made from a polymeric material (e.g., acrylonitrile butadiene siren (ABS), chlorinated polyvinyl chloride (CPVC), high-density polyethylene (HDPE), polybutylene (PB-1), polyethylene (PE, MDPE, HDPE, etc.), polyethylene of raised temperature (PE-RT), cross-linked polyethylene (PEX), polypropylene (PP), polyvinylidene difluoride (PVDF), un-plasticized polyvinyl chloride (UPVC)) that is able to withstand cryogenic temperatures. In various embodiments the bags disclosed herein are made of polyethylene, such as high-density polyethylene (HDPE), or the like. That is, the bags are resistant to brittleness and are not as susceptible to shattering at cryogenic temperatures. The bags are configured for ease of assembly and/or ease of transport. The bags disclosed herein may be produced at a lower cost relative to typical bags for transporting a plurality of envelopes containing blood bags. The bags disclosed herein may be produced with fewer components relative to typical blood bag transport bags.

In various embodiments, the bags disclosed herein are more robust, lighter, and/or easier to ship relative to typical transport systems for cryogenic articles. For example, a bag disclosed herein, in accordance with various embodiments, can be folded into a shipping configuration to reduce a cost of shipping from a manufacturer to an end user. Then, upon receipt by the end user, the carrying bag can easily transition into a loading configuration to load various cassettes configured to carry a biomaterial article, such as a blood bag. In various embodiments, the cassettes configured to transport articles such as blood bags disclosed herein may be double sealed from an external environment. The blood bags may include multiple layers between the blood bag and the external environment. The carrying bags disclosed herein may eliminate having to use metal cassettes and other complex heavier protection systems for blood bags, in various embodiments. In various embodiments, the carrying bags disclosed herein can still accommodate the metal cassettes. The present disclosure is not limited in this regard.

Finally, while extensive reference is made to "blood bags" herein, one may appreciate that similar systems, methods, and apparatuses may be implemented for other articles, such as different biomaterials, fragile objects or substances, and the like.

Figure 1A:
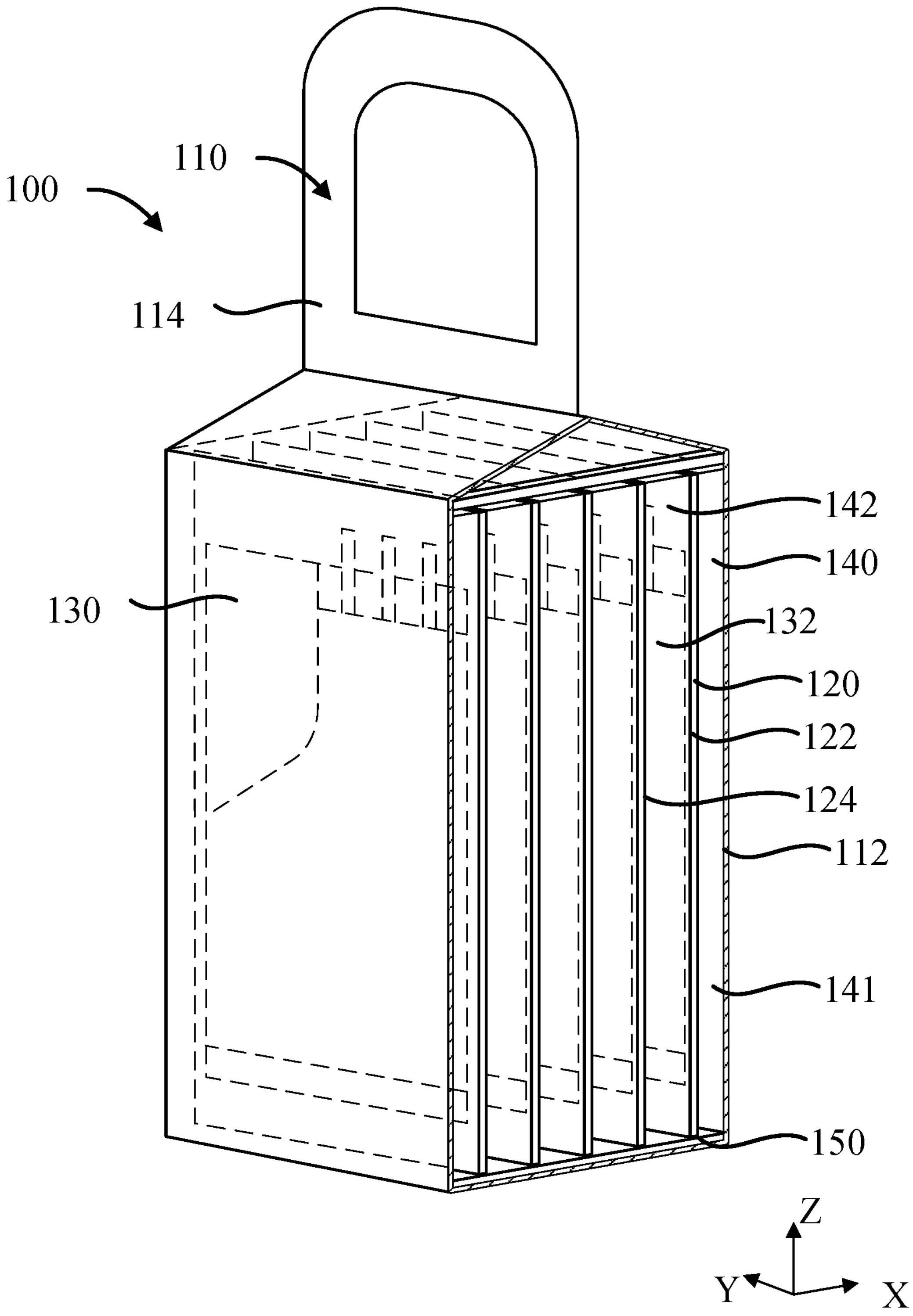
FIG. 1A illustrates a perspective cross-sectional view of a cryogenic articles transport assembly, in accordance with various embodiments.

Referring now to FIG. 1A, a perspective cross-sectional view of a cryogenic articles transport assembly 100 is illustrated, in accordance with various embodiments. The cryogenic articles transport assembly 100 comprises a carrying bag 110, a cassette bag 122 in a plurality of cassettes 120, a blood bag 132 disposed within the cassette bag 122, the blood bag 132 being one of a plurality of blood bags 130, a partition assembly 140, and a base 150. The cassette bag 122 is configured to house the blood bag 132. In this regard, the cassette bag 122 is configured to protect and/or support the blood bag 132 during transportation of the plurality of blood bags 130 via the cryogenic articles transport assembly 100.

In various embodiments, the partition assembly 140 defines a plurality of slots, each slot being configured to receive an envelope in the plurality of cassettes 120 as described further herein. In this regard, the partition assembly 140 can be configured to secure the cassettes 120 during transit and/or provide an additional absorbent layer between each blood bag in the plurality of blood bags 130 and an external environment. For instance, at least a portion of the partition assembly 140 may be arranged abutting an internal perimeter of the carrying bag 110). The plurality of cassettes 120 may be received into the slot defined by the partition assembly 140. In this regard, the partition assembly 140 can provide spacing and/or a support structure between adjacent cassettes 120 with blood bags 130 disposed therein. Thus, a portion of a partition sleeve 141 in the partition assembly 140 may be adjacent to both the cassette bag 122 and a wall 112 of the internal perimeter of the carrying bag 110. More specifically, a portion of the partition sleeve 141 of the partition assembly 140 may be interstitial between the cassette bag 122 and the wall 112 of the internal perimeter of the carrying bag 110.

In various embodiments, adjacent envelopes in the plurality of cassettes 120 may be separated by a partition 142 of the partition assembly 140 disposed between the adjacent cassette bags 122, 124. In various embodiments, the base 150 can comprise an absorbent material. In this regard, the partition assembly 140 can provide damping in the lateral direction (i.e., the X-direction and the Y-direction), and the base 150 can provide damping in the vertical direction (i.e., the Z-direction). In various embodiments, an absorbent layer can be provided vertically above the plurality of cassettes 120 (e.g., proximal the handles 114). However, the present disclosure is not limited in this regard. For example, since the handles 114 are used for carrying, the carrying bag is unlikely to be dropped on the handles 114 side of the carrying bag, in accordance with various embodiments.

In this regard, the plurality of cassettes 120 may be dampened in all directions or all directions except a top end of the carrying bag 110 proximal the handles during transport of the cryogenic articles transport assembly 100 (i.e., mechanically dampened from shock and vibration of the carrying bag 110 that may occur during transport). Thus, each blood bag in the plurality of blood bags 130 may be dampened by a respective envelope in the plurality of cassettes 120 as described further herein, as well as being dampened by the partition assembly 140 and the base 150, in accordance with various embodiments. Although illustrated in FIG. 1A as being a generally cuboidal shape, the present disclosure is not limited in this regard.

Figure 1B:
FIG. 1B illustrates a perspective view of a cryogenic articles transport assembly, in accordance with various embodiments.

For example, with reference now to FIG. 1B, a carrying bag 160 comprising a generally cylindrical shape is illustrated, in accordance with various embodiments. The term "generally" as referred to herein refers to a specified shape within a profile of 20% relative to nominal proportions for a nominal shape. For example, a "generally cuboidal shape" would define a cuboidal external shape in at least one configuration that is within a profile of 20% of a nominal cuboidal shape. In this regard, a generally cuboidal shape would not necessarily have exactly 90 degree angles and would still be defined by the term generally cuboidal shape, in accordance with various embodiments. In a further example, a "generally cylindrical shape" would define a cylindrical external shape in at least one configuration that is within a profile of 20% of a nominal cylindrical shape with nominal dimensions (i.e., a nominal radius and a nominal height). In this regard, a generally cylindrical shape would not necessarily have exactly constant radius at all points around a section of the shape and would still be defined by the term generally cylindrical shape, in accordance with various embodiments.

In various embodiments, the term "generally" as referred to herein refers to a specified shape can mean within a profile of 0.25 inches (0.635 cm) of a nominal shape. For example, a "generally cuboidal shape" would define a cuboidal external shape in at least one configuration that is within a profile of 0.25 inches (0.635 cm) of a nominal cuboidal shape. In this regard, a generally cuboidal shape would not necessarily have exactly 90 degree angles and would still be defined by the term generally cuboidal shape, in accordance with various embodiments. In a further example, a "generally cylindrical shape" could define a cylindrical external shape in at least one configuration that is within a profile of 0.25 inches (0.635 cm) of a nominal cylindrical shape with nominal dimensions (i.e., a nominal radius and a nominal height). In this regard, a generally cylindrical shape would not necessarily have exactly constant radius at all points around a section of the shape and would still be defined by the term generally cylindrical shape, in accordance with various embodiments In various embodiments, as described further herein, although the carrying bag 160 can comprise a cuboidal shape, the carrying bag 160 may not form a cuboidal shape during transit. In this regard, the base of the carrying bag 160 can comprise a circular shape, and the exterior surfaces of the carrying bag 160 can converge towards a flat, sealed portion of the carrying bag 160, in accordance with various embodiments. Although described further herein with respect to the generally cylindrical type carrying bag (e.g., carrying bag 160), the present disclosure is not limited in this regard. For example, the principles disclosed herein can be utilized for a cuboidal shaped bag (e.g., as shown in FIG. 1A), and cuboidal shaped bags are still within the scope of this disclosure. However, cuboidal shaped carrying bags can be more prone to damage during assembly and/or can take longer to assemble relative to generally cylindrical shaped carrying bags (e.g., carrying bag 160).

Figure 2A:
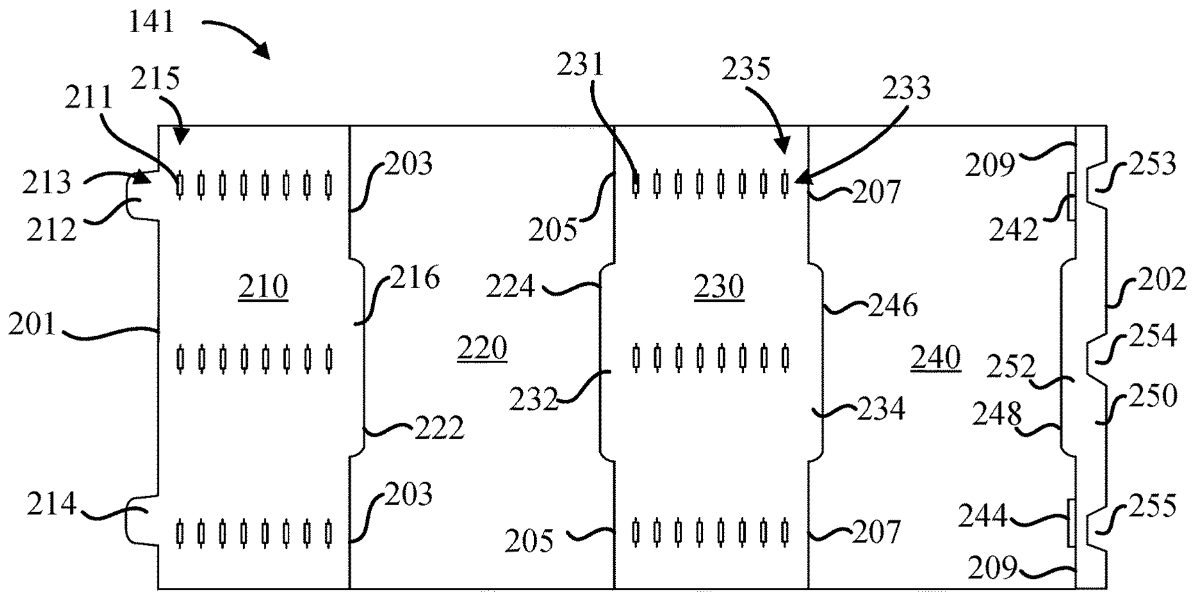
FIG. 2A illustrates a partition sleeve prior to assembly, in accordance with various embodiments.

Referring now to FIG. 2A, a flat view of a partition sleeve 141 in a disassembled state is illustrated, in accordance with various embodiments. A "disassembled state" as referred to herein, refers to a manufactured state, prior to assembly (i.e., prior to being used in a cryogenic transport assembly 100 from FIG. 1A). In the disassembled state, the partition sleeve 141 extends from a first side edge 201 to a second side edge 202.

The partition sleeve comprises a first side panel 210, a second side panel 230, a front panel 220, a back panel 240, and a flap panel 250. In various embodiments, the panels 210, 220, 230, 240 define an outer surface of the portion assembly. In various embodiments, in an assembled state, the flap panel 250 is internal to the first side panel 210 and abuts a partition 142 (FIG. 2B), as described further herein. In various embodiments, the first side panel 210 comprises tabs 212, 214, and the back panel 240 comprises slots 242, 244. The tab 212 is configured to extend into the slot 242, and the tab 214 is configured to extend into the slot 244 to from an assembled state of the partition sleeve 141 as described further herein. Although illustrated as comprising two tabs 212, 214, the present disclosure is not limited in this regard. For example, a singular tab could be utilized, or three or more tabs could be utilized and still be within the scope of this disclosure as long as there were a corresponding number of slots for the respective tabs.

In various embodiments, the tabs 212, 214 extend outward from the edge 201. Similarly, a tab 216 of the first side panel extends away from an edge 203 of the first side panel 210 and the front panel 220. The tab 216 extends in an opposite direction relative to tabs 212, 214. Tab 216 aligns with a respective recess 222 in edge 203 between the front panel 220 and the side panel 210. In various embodiments, the recess 222 and the tab 216 facilitate pivoting of the first side panel 210 relative to the front panel 220 as described further herein.

Similarly, the front panel 220 and the second side panel 230 define an edge 205, the second side panel 230 includes a tab 232 extending away from the edge 205, and the front panel 220 includes a second recess 224 extending away from the edge 205 and towards the edge 203. The recess 224 and the tab 232 facilitate pivoting of the front panel 220 relative to the side panel 230 about the edge 205.

Similarly, the back panel 240 and the second side panel 230 define an edge 207, the second side panel 230 includes a second tab 234 extending away from the edge 207, and the back panel 240 includes a recess 246 extending away from the edge 207 and towards an edge 209. The edge 209 is defined by the back panel 240 and the flap panel 250. The recess 246 and the tab 234 facilitate pivoting of the back panel 240 relative to the side panel 230 about the edge 207.

Similarly, the back panel 240 and the flap panel 250 define the edge 209, the flap panel 250 includes a tab 252 extending away from the edge 209, and the back panel 240 includes a second recess 248 extending away from the edge 209 and towards the edge 207. The second recess 248 and the tab 252 facilitate pivoting of the flap panel 250 relative to the back panel 240 about the edge 209.

In various embodiments, the edge flap includes the edge 202 spaced apart from the edge 209. The edge 202 defines recesses 253, 254, 255 spaced apart in a vertical direction along the edge 202. The recesses 253, 254, 255 are configured to interface with a respective partition (e.g., partition 142 from FIG. 2B), to facilitate structural stability of the partition assembly, as described further herein, in accordance with various embodiments.

The first side panel includes a plurality of slots 211 disposed therethrough, and the second side panel 230 includes a plurality of slots 231. In various embodiments, the plurality of slots 211 are arranged in rows 213 and columns 215, and the plurality of slots 231 are arranged in rows 233 and columns 235. A number of rows 213 and columns 215 for the first side panel 210 correlate to a number of rows 233 and columns 235 for the second side panel 230. In this regard, a column 215 of the plurality of slots 211 are configured to receive tabs of a partition (e.g., partition 142 in FIG. 2B) and a column 235 of the plurality of slots 231 are configured to receive tabs of the partition on an opposite side and define a slot therein in an assembled state of the partition assembly 140 from FIG. 1A, as described further herein.

Figure 2B:
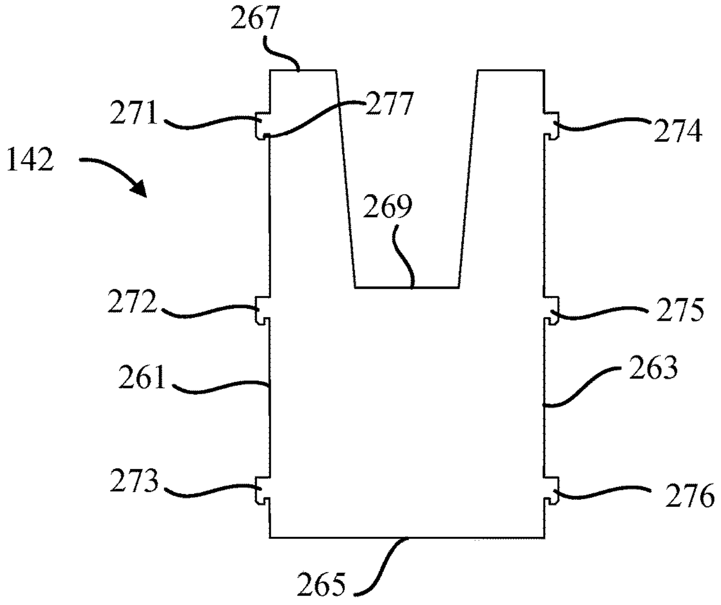
FIG. 2B illustrates a partition for a partition assembly, in accordance with various embodiments.

Referring now to FIG. 2B, a front view of a partition 142 is illustrated, in accordance with various embodiments. In various embodiments, the partition 142 is a flat sheet. The partition is at least partially defined by a first side 261, a second side 263, a bottom side 265, and a top side 267. The first side 261 is disposed opposite the second side 263.

In various embodiments, the partition 142 comprises tabs 271, 272, 273 extending away from the first side 261 (i.e., in a distal direction to the second side 263). Similarly, the partition 142 comprises tabs 274, 275, 276 extending away from the second side 263 (i.e., in a distal direction to the first side 261).

In various embodiments, each tab of the partition 142 is configured to be coupled to a side panel of the partition sleeve 141 (e.g., side panel 210 or side panel 230) to at least partially define a slot in the partition assembly 140 from FIG. 1A as described further herein. For example, the tab 271 is configured to be inserted through a slot in the plurality of slots 211 and a shoulder 277 of the tab 271 is configured to interface with a bottom portion of the slot in the plurality of slots 211 to secure the partition 142, at least partially, to the side panel 210, in accordance with various embodiments.

Although illustrated as comprising three tabs per side of the partition 142, the present disclosure is not limited in this regard. For example, any number of tabs could be utilized and be within the scope of this disclosure (i.e., one or more tabs per side), as long as the number of tabs on a side of the partition 142 corresponds to a number of slots in a side panel of the partition sleeve 141.

Although illustrated as including a same number of tabs on each side of the partition 142, the present disclosure is not limited in this regard. For example, the partition could have more or less tabs on a first side of the partition 142 relative to a second side of the partition 142 and still be within the scope of this disclosure.

In various embodiments, the partition 142 comprises a recess 269 extending from the top side 267 towards the bottom side 265 of the partition. In various embodiments, the recess 269 provides flexibility to the partition to facilitate assembling the partition 142 with the partition sleeve 141 from FIG. 2A.

Figure 3A:
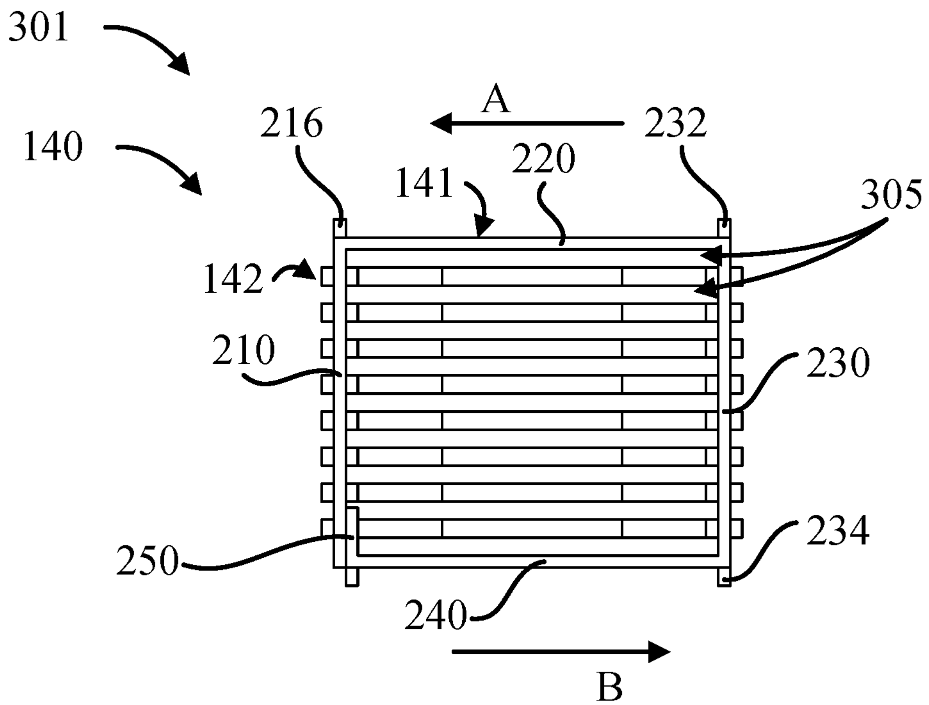
FIG. 3A illustrates a top down view of a partition assembly in an extracted configuration, in accordance with various embodiments.

Referring now to FIG. 3A, a top down view of a partition assembly 140 in an extracted configuration 301, in accordance with various embodiments, is illustrated, with like numerals depicting like elements. An "extracted configuration 301" as referred to herein refers to a configuration of the partition assembly configured to receive cassettes 120 from FIG. 1A, in accordance with various embodiments. With reference to both FIGS. 3A and 3B, an "extracted configuration 301" is in contrast to a "flattened configuration 302". In a "flattened configuration 302", as described further herein, the partition assembly 140 is in a configuration that is capable of being shipped in a relatively flat configuration (i.e., having a thickness that is between 10 and 1,000 times smaller than a width or a length of the partition assembly).

In various embodiments, partitions 142 are coupled to the partition sleeve 141 to form the partition assembly 140 as described previously herein. The partition assembly 140 defines a plurality of slots 305, each slot 305 configured to receive a cassette bag 122 in the plurality of cassettes 120 from FIG. 1A. In various embodiments, slots 305 are defined at least partially between adjacent partitions 142 between a partition 142 and the front panel 220, or between a partition 142 and the back panel 240. Although illustrated as including eight partitions, the present disclosure is not limited in this regard, and any number of partitions is within the scope of this disclosure. In various embodiments, a number of slots in the plurality of slots 305 corresponds to a number of partitions plus two (i.e., plus a slot defined on the front panel 220 side and a slot defined on the back panel 240 side.

Figure 3B:
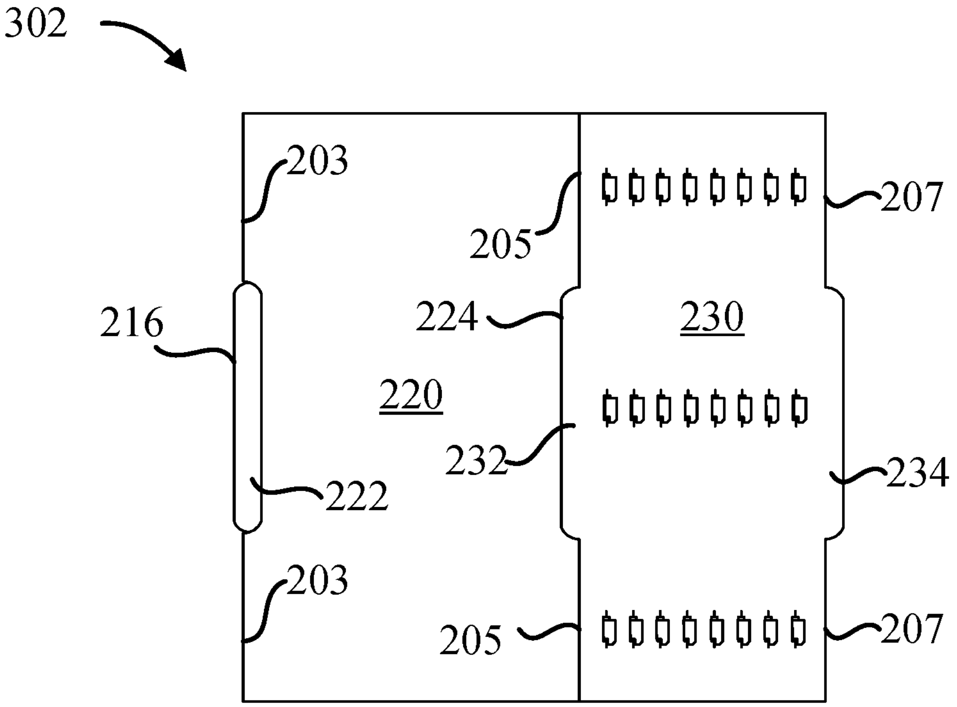
FIG. 3B illustrates a front view of a partition assembly in a flattened configuration, in accordance with various embodiments.

In various embodiments, a design of the partition assembly 140 facilitates easily transitioning the partition assembly 140 from the extracted configuration 301 (as shown in FIG. 3A), to a flattened configuration 302 (as shown in FIG. 3B) and vice versa, in accordance with various embodiments. For example, by pulling the front panel 220 in a first direction A and pulling the back panel 240 in a second direction B, the second direction being opposite from the first direction A, the partition assembly can easily transition from the extracted configuration 301 of FIG. 3A, to a flattened configuration 302 of FIG. 3B.

Referring now to FIG. 3B, a front view of the partition assembly 140 in a flattened configuration 302 is illustrated, in accordance with various embodiments. As described previously herein, the tabs 216, 232, 234, 252 from FIG. 2A of the partition sleeve 141 facilitate an ease of pivoting about edges 203, 205, 207, 209 of the partition sleeve 141. In this regard, in the flattened configuration two tabs extend in an opposite direction from their respective recesses, and two tabs remain within their respective recesses. For example, the tab 216 of the first side panel 210 extends in an opposite direction with respect to a recess 222 of the front panel 220, and the tab 232 of the side panel 230 remains within the recess 224 of the front panel in the flattened configuration of FIG. 3B.

In various embodiments, by having a partition assembly 140 that easily transitions from a flattened configuration 302 to an extracted configuration 301 as disclosed herein, the partition assembly 140 can be assembled into a carrying bag 110 from FIG. 1A in the flattened configuration 302, then shipped to an end user where the carrying bag 110 and the partition assembly 140 can be transitioned to an extracted configuration 301 and loaded with respective cassettes 120 from FIG. 1A, then sealed as described further herein for transporting the blood bags 130 by the end user. In this regard, shipping costs can be greatly reduced by shipping the carrying bag 110 from FIG. 1A with the partition assembly 140 in a flattened configuration 302, in accordance with various embodiments. Additionally, by being able to ship the partition assembly 140 pre-loaded in the carrying bag 110 from FIG. 1A, a loading time by an end user can be greatly reduced, and loading can be performed significantly easier relative to typical biomaterial transport assemblies, in accordance with various embodiments.

Figure 4A:
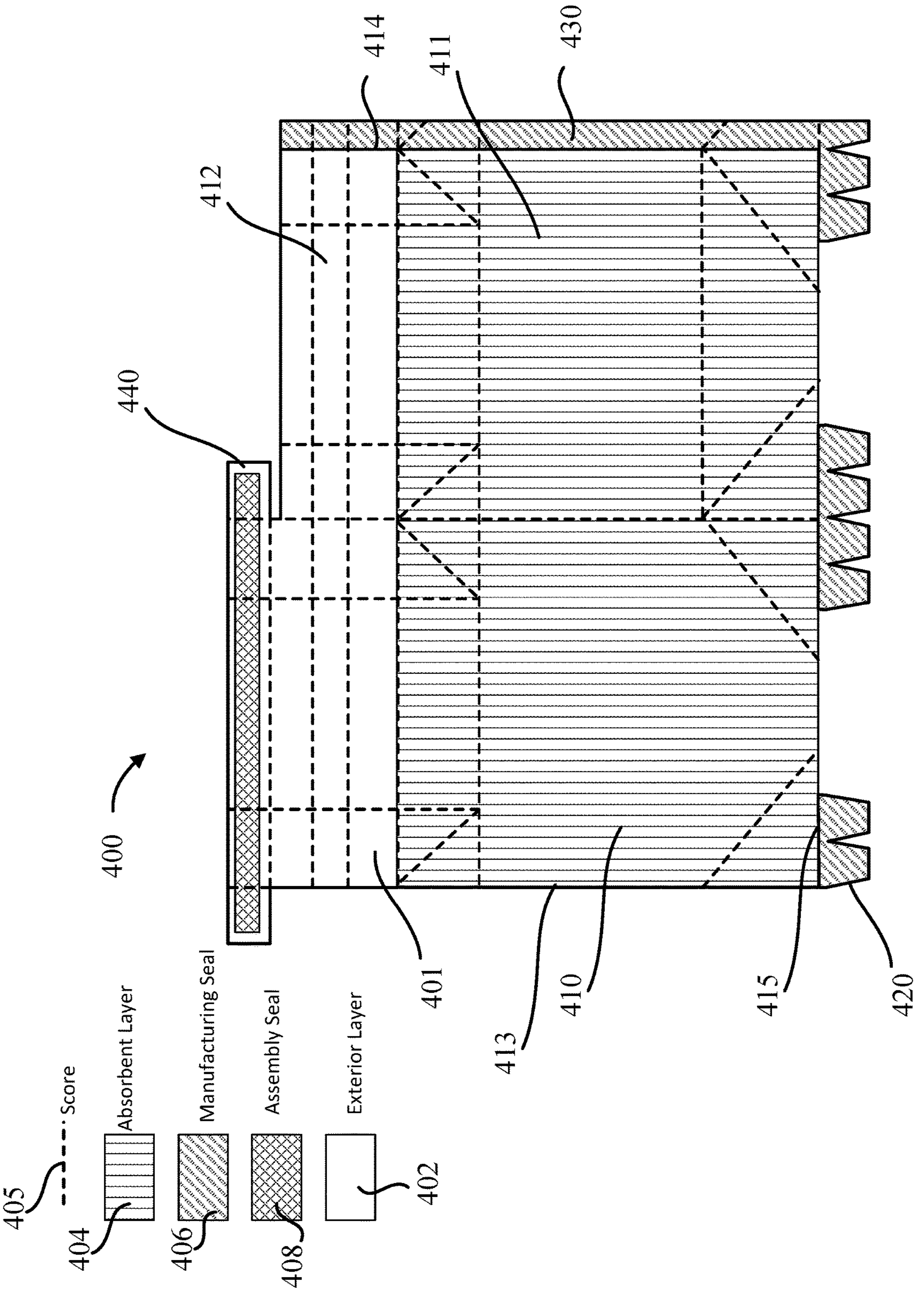
FIG. 4A illustrates a main body of a carrying bag prior to manufacturing, in accordance with various embodiments.

Referring now to FIG. 4A, a main body 400 of a carrying bag 160 in a pre-manufactured state is illustrated, in accordance with various embodiments. As described herein, a "pre-manufactured state" refers to a state of the main body 400 prior to manufacturing of the carrying bag. In the pre-manufactured state, the main body 400 can be a flat sheet having a perimeter as illustrated.

In various embodiments, the main body 400 is made at least of a first material (e.g., an exterior layer 402) configured to provide a dimensional-stable print surface. For example, the main body 400 can comprise a barrier layer (e.g., with enhanced burst strength), in accordance with various embodiments. The exterior layer 402 of the main body 400 can comprise a high-density polyethylene (HDPE) material, such as that sold under the trademark Tyvek® 1073B by Dupont de Numours, Inc. based in Wilmington, Delaware. However, the present disclosure is not limited in this regard. For example, the main body 400 can be made of any polymeric material, (e.g., acrylonitrile butadiene siren (ABS), chlorinated polyvinyl chloride (CPVC), high-density polyethylene (HDPE), polybutylene (PB-1), polyethylene (PE, MDPE, HDPE, etc.), polyethylene of raised temperature (PE-RT), cross-linked polyethylene (PEX), polypropylene (PP), polyvinylidene difluoride (PVDF), un-plasticized polyvinyl chloride (UPVC)) that is able to withstand cryogenic temperatures.

In various embodiments, an absorbent layer 404 is coupled to the exterior layer of the main body 400. In a manufactured state (i.e., post-manufacturing of the carrying bag 160 from FIG. 1B), the absorbent layer 404 is disposed on an internal surface 401 of the exterior layer 402. In this regard, the absorbent layer 404 is configured to provide damping in an outward direction (e.g., radially outward, laterally outward, or the like) during transportation of the blood bags 130 from FIG. 1A.

In various embodiments, the absorbent layer 404 is configured to protect contents being transported (e.g., biomaterials such as a blood bag 130) from humidity changes. In various embodiments, the absorbent layer 404 is configured for high moisture absorption relative to typical materials. For example, the absorbent layer 404 can comprise an absorbent polymer material capable of absorbing between 25 times and 1,000 times its own weight in water. In various embodiments, the absorbent layer 404 comprises a super-absorbent polymer. However, the present disclosure is not limited in this regard. In various embodiments, the absorbent layer 404 is configured to provide additional burst strength. In various embodiments, the absorbent layer 404 can be Therapak™ absorbent material, such as that sold under the trademark Therapak™ 10312 by Avantor Clinical Services based in Chorley Lancashire, United Kingdom.

In various embodiments, the main body 400 comprises an outer sleeve 410, a plurality of tabs 420, an edge panel 430, and a top flap 440. In various embodiments, the main body comprises various scores 405 (i.e., a ridge in the main body 400 to facilitate folding). Stated another way, the various scores 405 form as fold lines to facilitate folding of the main body 400 for various reasons as described further herein.

In various embodiments, the outer sleeve 410 comprises a first portion 411 and a second portion 412. In various embodiments, as described further herein, in an assembled state, the first portion 411 can generally form an annular portion (i.e., a radially outer portion) of the carrying bag 160, and the second portion 412 can form a top portion of the carrying bag 160. In this regard, the second portion 412 can be configured to fold about various scores to facilitate sealing of the top of the carrying bag 160 as described further herein.

In various embodiments, in the pre-manufactured state, the outer sleeve 410 extends from a first edge 413 to a second edge 414. The edge panel 430 extends outward from the second edge 414 (i.e., in a direction away from the first edge 413) in the pre-manufactured state. In various embodiments, the edge panel 430 comprises a manufacturing seal 406 configured to couple the first edge 413 of the outer sleeve 410 to the second edge 414 of the outer sleeve. In this regard, during manufacturing of the carrying bag, the edge panel 430 extends past the first edge 413 and is coupled to the main body 400 in order to define a cavity of the carrying bag 160 as described further herein. In various embodiments, a "manufacturing seal" as disclosed herein refers to a seal configured to bond a surface with the manufacturing seal to an adjacent surface to join (or fixedly) couple the two surfaces during manufacturing (i.e., during making of the carrying bag). In contrast, an "assembly seal" as disclosed herein refers to a seal that is configured to join two surfaces together after assembly of the cryogenic transport assembly 100 from FIGS. 1A-B, in accordance with various embodiments.

In various embodiments, an assembly seal 408 is coupled to the top flap 440. In this regard, as described further herein, the assembly seal 408 is configured to couple the top flap 440 to the second portion 412 of the outer sleeve 410 after assembly of the cryogenic articles transport assembly 100 from FIGS. 1A-B, to seal a cavity within the carrying bag 160, in accordance with various embodiments. In this regard, the assembly seal 408 can comprise a double sided tape. In various embodiments, a first side of the double sided tape can be coupled to the top flap 440 and a second side of the double sided tape can be coupled to a protective layer. In this regard, the second side of the double sided tape can maintain its adhesive properties until sealing of a cavity in the carrying bag 160 is desired, as described further herein.

Figure 7:
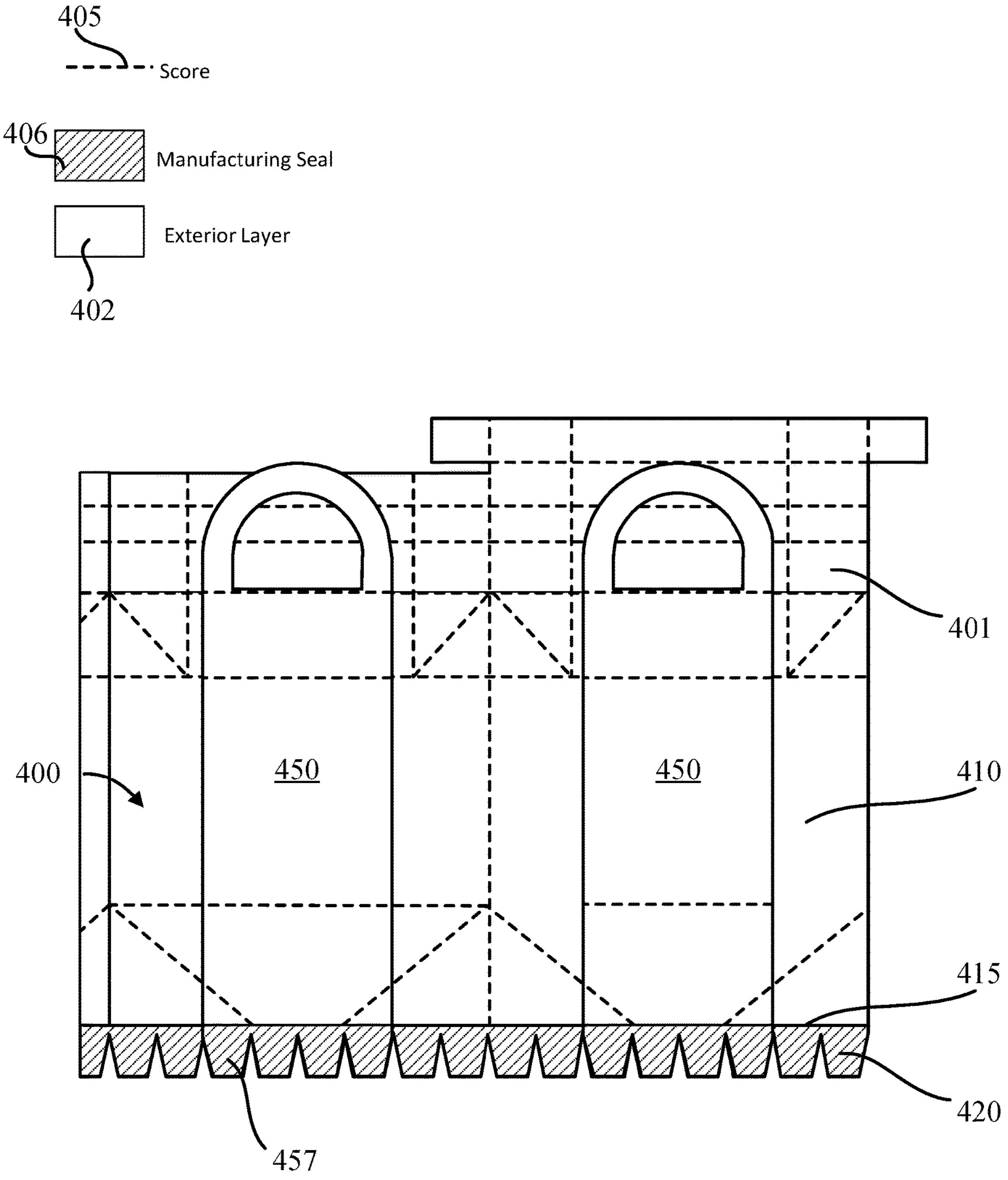
FIG. 7 illustrates a portion of a carrying bag during assembly, in accordance with various embodiments.

In various embodiments, each tab in the plurality of tabs 420 extends away from a bottom edge 415 of the outer sleeve 410. Each tab in the plurality of tabs 420 is configured to partially overlap an adjacent tab in the plurality of tabs 420 during manufacturing of the carrying bag 160, as described further herein. Each tab in the plurality of tabs 420 includes the manufacturing seal 406. In this regard, the plurality of tabs 420 are configured to fold about the bottom edge 415 and couple to a base (e.g., base sheet 500 from FIG. 5A) as described further herein, in accordance with various embodiments. For example, during manufacturing of the carrying bag 160, after the edge panel 430 couples the first edge 413 to the second edge 414, the plurality of tabs 420 can be folded radially inward coupled to a base (e.g., base sheet 500 from FIG. 5A), in accordance with various embodiments. In various embodiments, sets of tabs 420 are spaced apart from each other along bottom edge 415. In this regard, the tabs 457 of handles 450 from FIG. 4B can fill the space between sets of tabs 420 to create a continuous group of tabs as shown in FIG. 7, in accordance with various embodiments.

Figure 4B:
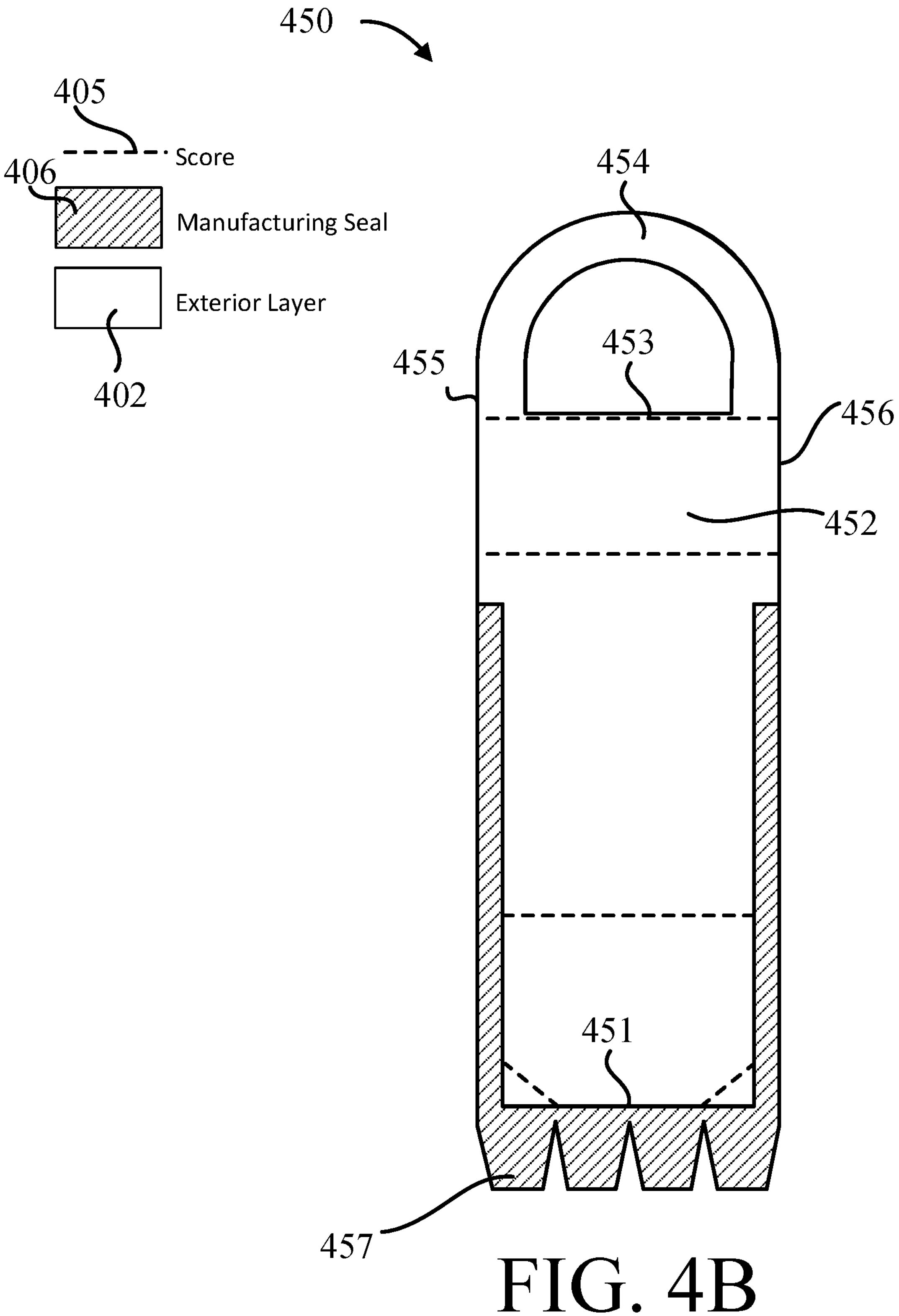
FIG. 4B illustrates a handle of a carrying bag prior to manufacturing, in accordance with various embodiments.

Referring now to FIG. 4B, a front view of a handle 450 prior to manufacturing of carrying bag 160 from FIG. 1B is illustrated, in accordance with various embodiments. The handle 450 comprises the exterior layer 402 and the manufacturing seal 406 described previously herein. In this regard, the manufacturing seal 406 is configured to couple the handle 450 to the main body 400 during manufacturing of the carrying bag 160.

In various embodiments, the handle 450 comprises a body 452 extending vertically from a bottom edge 451 to a top edge 453. Extending away from the top edge 453 is a handle portion 454 of the handle 450. The handle portion 454 can include an arcuate shape extending from a first side 455 of the handle 450 to a second side 456 of the handle 450. The handle portion 454 and the top edge 453 define an aperture. In this regard, the handle portion 454 facilitates carrying of the carrying bag 160 from FIG. 1B, in accordance with various embodiments. In various embodiments, the carrying bag 160 can include two of the handle 450. In this regard, handles 450 can be disposed opposite each other (i.e., approximately 180 degrees apart) on the outer sleeve 410 in an assembled state as described further herein, in accordance with various embodiments.

In various embodiments, the manufacturing seal 406 extends vertically from the bottom edge 451 along the first side 455 and the second side 456. Although illustrated as only being disposed on a portion of the width of the handle 450 along each side 455, 456, the present disclosure is not limited in this regard. For example, the manufacturing seal could extend entirely across the handle from the first side 455 to the second side 456 and still be within the scope of this disclosure.

In various embodiments, the handle 450 comprises a tab 457 extending away (i.e., in downward direction) from the bottom edge 451. In various embodiments, the tabs 457 are configured to interface with (and couple to) complementary tabs from the main body 400 during manufacturing of the carrying bag 160, in accordance with various embodiments. Although illustrated as including the tabs 457, the present disclosure is not limited in this regard. For example, the handle 450 could be manufactured without the tabs 457 and still be within the scope of this disclosure. In various embodiments, the tabs 457 provide additional structural stability during carrying of the carrying bag 160 from FIG. 1B, relative to handles without the tabs 457, during transport, as they extend under the carrying bag 160 and couple to the base (e.g., base sheet 500 from FIG. 5A), in accordance with various embodiments.

Figure 5A:
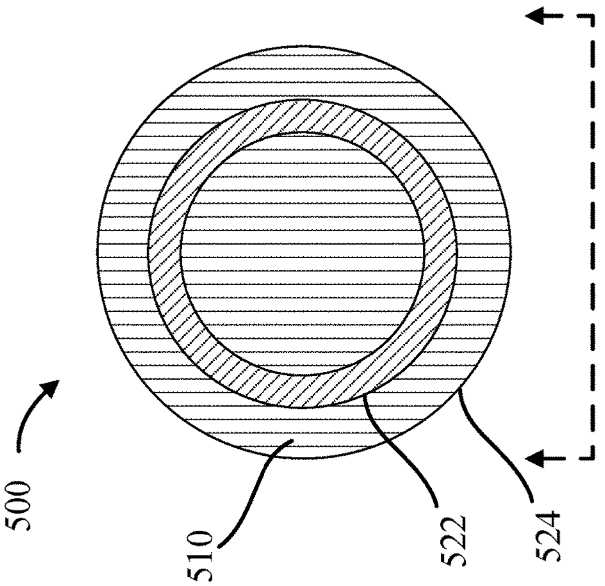
FIG. 5A illustrates a base sheet of a bottom portion of a carrying bag prior to manufacturing, in accordance with various embodiments.

Referring now to FIG. 5A, a top down view of a base sheet 500 is illustrated, in accordance with various embodiments. In various embodiments, the base sheet 500 comprises a circular, or generally circular shape. In this regard, a "generally circular shape" as referred to herein has a profile within 20% of a nominal circular shape having a nominal radius. In this regard, a generally circular shape is not necessarily circular, in accordance with various embodiments. In various embodiments, a "generally circular shape" as referred to herein can mean a profile within 0.25 inches (0.635 cm) of a nominal circular shape.

Figure 5B:
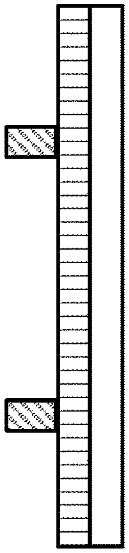
FIG. 5B illustrates a cross-sectional view of the base sheet from FIG. 5A, in accordance with various embodiments.

Referring now to FIG. 5B, a cross-sectional view along section line A-A from FIG. 5A is illustrated, in accordance with various embodiments (not to scale). With combined reference to FIGS. 5A and 5B, the base sheet 500 comprises an exterior layer 402, an absorbent layer 404 disposed on top of the exterior layer 402, and a manufacturing seal 406 disposed on the absorbent layer and having an annular ring shape. A mating surface 510 is disposed radially between a radially outer edge 522 of the manufacturing seal 406 and a radially outer edge 524 of the absorbent layer 404. In this regard, the mating surface 510 is configured to mate with and couple to the tabs 420 of the main body 400 and the tabs 457 of the handles 450, in accordance with various embodiments, as described further herein. Although tabs 420, 457 are shown on the main body 400 and the handles 450, the present disclosure is not limited in this regard. For example, the tabs 420, 457 could extend radially outward from the radially outer edge 524 of the base sheet 500 and still be within the scope of this disclosure.

Figure 6:
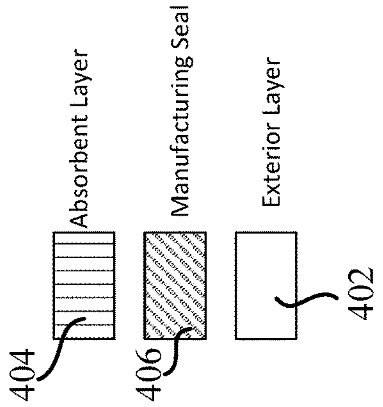
FIG. 6 illustrates an absorbent sheet of a bottom portion of a carrying bag prior to manufacturing, in accordance with various embodiments.
Figure 6:
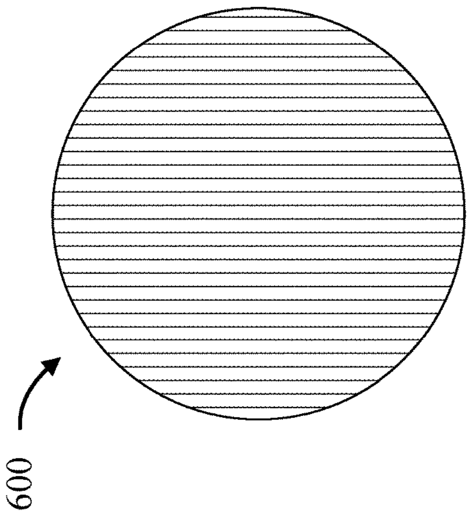

Referring now to FIG. 6, an absorbent sheet 600 is illustrated, in accordance with various embodiments. The absorbent sheet 600 is made of the absorbent layer 404. In various embodiments, the absorbent sheet 600 is configured to be coupled to the base sheet 500 via the manufacturing seal 406 as described further herein.

Referring now to FIG. 7, the main body 400 and two handles 450 during manufacturing of the carrying bag 160 are illustrated, in accordance with various embodiments. In various embodiments, the handle 450 is coupled to an exterior layer 402 of the main body 400 via the manufacturing seal 406 of the handles 450. In various embodiments, the manufacturing seal 406 can be disposed on an interior surface of the handle 450 as shown in FIG. 4B, and the manufacturing seal 406 can be disposed on an exterior surface of the handle 450 as shown in FIG. 7. In this regard, the tabs 457 of the handle 450 can include the manufacturing seal 406 on both sides, in accordance with various embodiments. Similarly, the tabs 420 can include the manufacturing seal 406 on both sides of the tabs 420. In this regard, with brief reference to FIG. 8, a manufacturing seal 702 disposed on a top surface of a tab 420 (or tab 457) can couple the tab 420 (or tab 457) to a bottom surface of the absorbent sheet 600, and a manufacturing seal 704 disposed on a bottom surface of the tab 420 (or tab 457) can couple the bottom surface of the tab 420 (or the tab 457) to a top surface of the base sheet 500, in accordance with various embodiments.

Referring back to FIG. 7, scores 405 of at least one handle 450 can align with scores 405 on the main body (e.g., the left handle 450 in FIG. 7). In this regard, the scores 405 disposed on the bottom portion of the carrying bag 160 described further herein can facilitate folding of the base portion of the carrying bag 160 to further facilitate shipping of the carrying bag 160 in a flattened shape as described further herein. In various embodiments, the handles 450 can both be manufactured with the same scores 405 to reduce a part count (i.e., to only have to manufacture a single type of handle). However, the present disclosure is not limited in this regard. For example, the two handles utilized in the carrying bag assembly do not have to have scores in the same locations as illustrated in FIG. 7 and would still be within the scope of this disclosure.

In various embodiments, the scores 405 disposed on a top portion of the handles 450 facilitate easy access to an internal cavity of the carrying bag 160 prior for loading cassettes 120.

Figure 8:
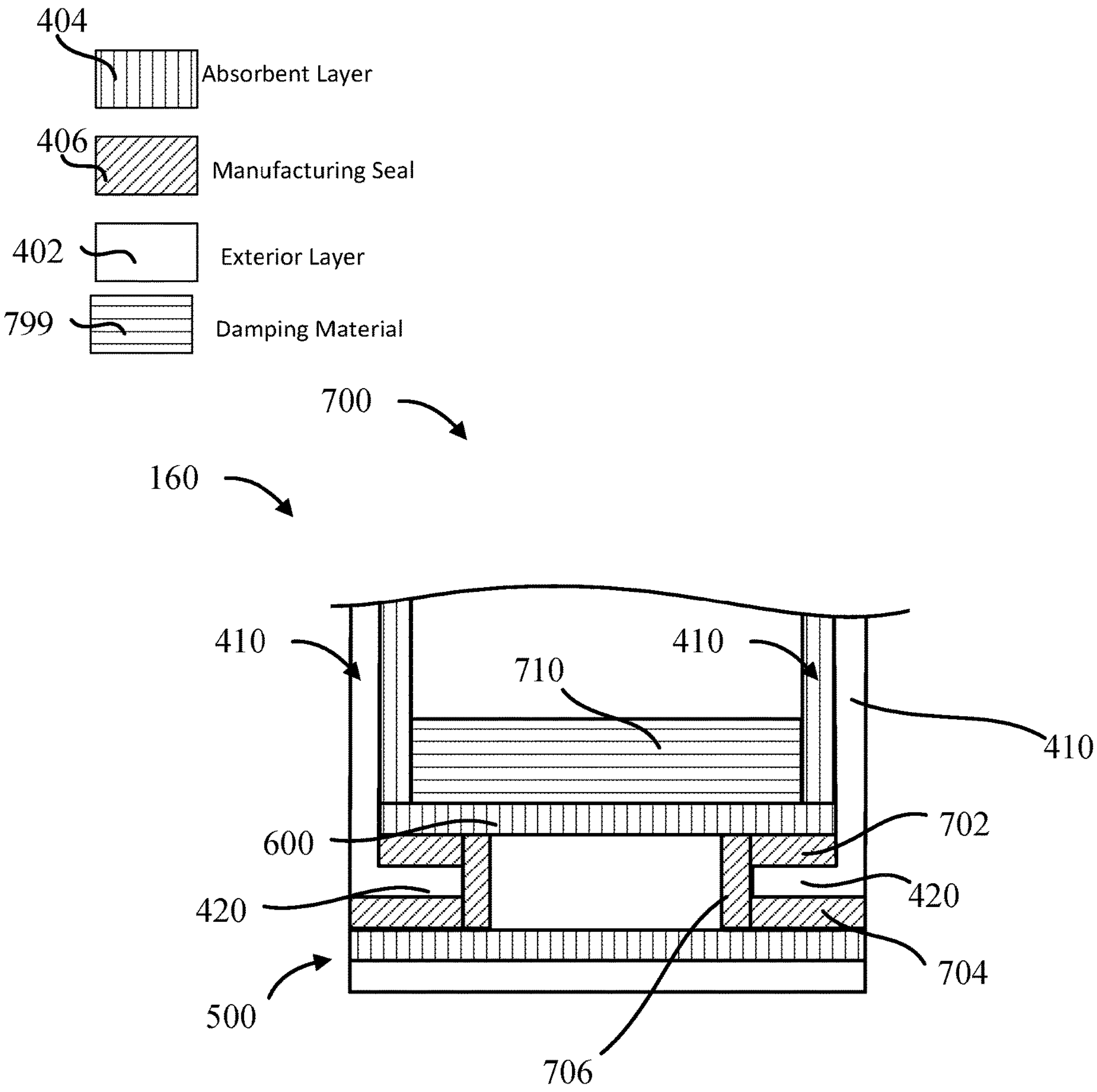
FIG. 8 illustrates a cross-sectional view of a bottom portion of a carrying bag in a loading configuration without a partition assembly, in accordance with various embodiments.

Referring now to FIG. 8, a cross-sectional view of a bottom portion of a carrying bag 160 in an assembled state (i.e., prior to transporting a cryogenic transport assembly 100) is illustrated without the partition assembly 140, in accordance with various embodiments. As illustrated, the bottom portion 700 of carrying bag 160 is not to scale. In particular, the main body 400, the manufacturing seals 406, and the absorbent layers 404 are illustrated as being thicker than they would actually appear. In particular, the base sheet 500 would essentially be in contact with the absorbent sheet 600, in accordance with various embodiments. Thus, the greater thickness is shown for illustrative purposes, in accordance with various embodiments.

In various embodiments, a manufacturing seal 706 of the base sheet 500 couples the base sheet 500 to the absorbent sheet 600. The absorbent sheet 600 acts as a bottom portion of an interior of the carrying bag 160 in accordance with various embodiments. In various embodiments, a damping component 710 including a damping material 799 (e.g., a foam, an elastomeric material, a polymeric material, or the like) is disposed on the absorbent sheet 600. In this regard, the damping component 710 can be configured to absorb forces from cassettes 120 described previously herein during transport of the cassettes 120. Thus, the damping component 710 can provide additional damping to the cryogenic transport assembly 100, in accordance with various embodiments.

In various embodiments, the damping component 710 can be a loose component (e.g., not coupled to any other component). In various embodiments, the damping component 710 can be coupled to the absorbent sheet 600. The present disclosure is not limited in this regard.

Figure 9:
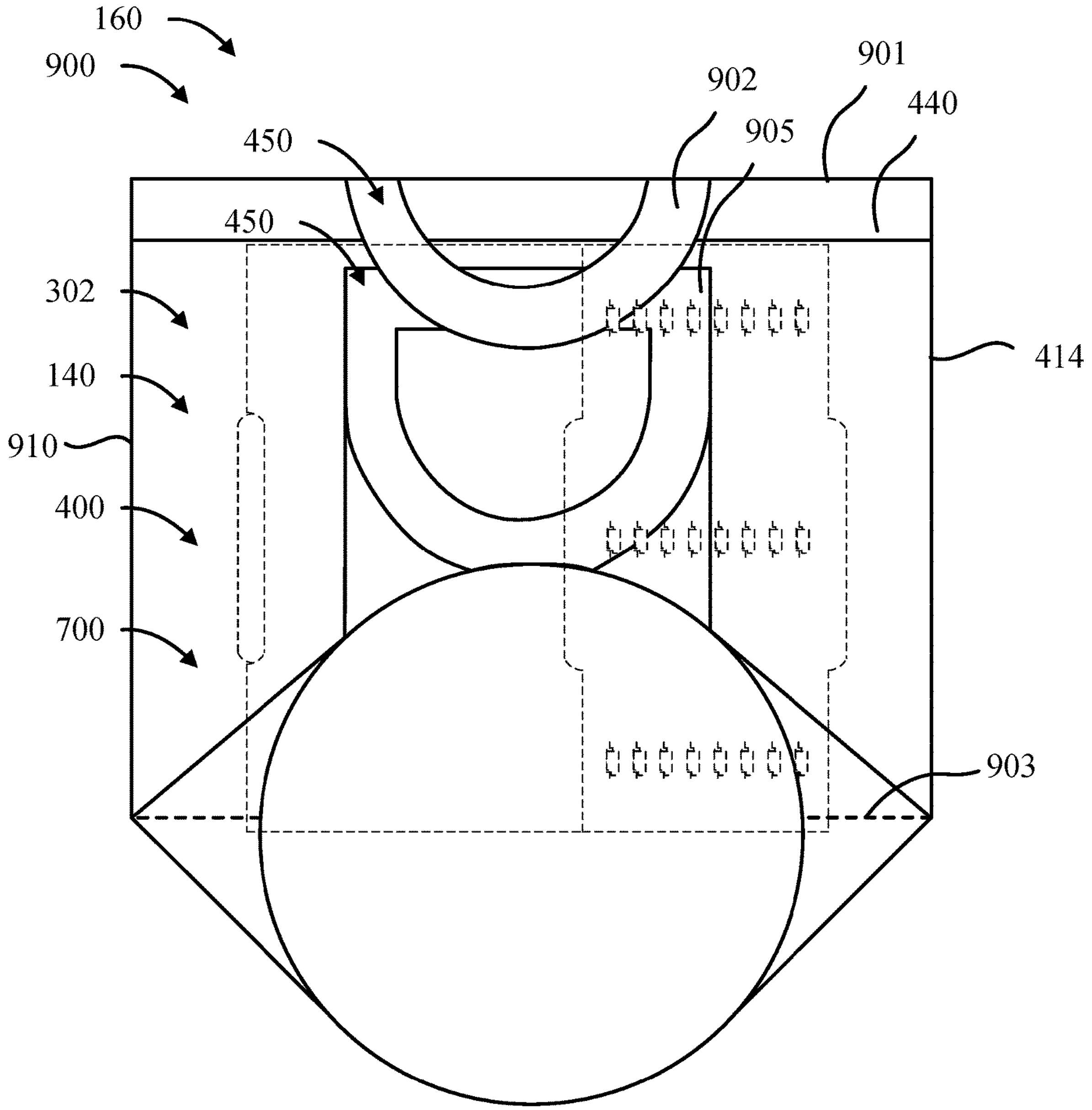
FIG. 9 illustrates a front view of a carrying bag in a shipping configuration, in accordance with various embodiments.

Referring now to FIG. 9, a top down view of a carrying bag 160 in a manufactured state in a shipping configuration 900 is illustrated, in accordance with various embodiments. A shipping configuration 900, as referred to herein, refers to a configuration of the carrying bag 160 for shipping the carrying bag 160 to an end user (i.e., for shipping without any biomaterials disposed therein). In various embodiments, in the shipping configuration, the partition assembly 140 from FIG. 3B is disposed therein in the flattened configuration 302 (as shown with the hidden lines in FIG. 9). In various embodiments, the scores 405 of the carrying bag 160 (i.e., as shown in main body 400 and handles 450 from FIGS. 4A-B) facilitate folding of the carrying bag 160 to the shipping configuration 900. In the shipping configuration 900, the carrying bag 160 is configured to flatten significantly relative to a loading configuration as shown in FIG. 1B. In this regard, the carrying bag 160 can be reduced significantly in size for shipping the carrying bag 160 from a manufacturer of the carrying bag 160 to an end user as described previously herein.

In various embodiments, once an end user receives the carrying bag 160 in the shipping configuration 900, transitioning to a loading configuration is quick. With continued reference to FIG. 9, a first handle 902 is rotated over a top edge 901. In this regard, the second handle 905 is disposed opposite (i.e., approximately 180 degrees apart) from the first handle 902, and the top flap 440 is able to be opened. Then, the bottom portion 700 is pivoted about a score 903 (which is defined by a score 405 from FIG. 4A). Then, the top flap 440 is opened by pivoting the top flap about the top edge 901 (which is defined by a score 405 from FIG. 4A), resulting in a carrying bag as illustrated in FIG. 10.

In various embodiments, in the shipping configuration 900, an edge 910 of the carrying bag 160 is disposed opposite the edge 414 described previously herein. In this regard, the edge 910 corresponds to a score 405 from FIG. 4A, in accordance with various embodiments.

Figure 10:
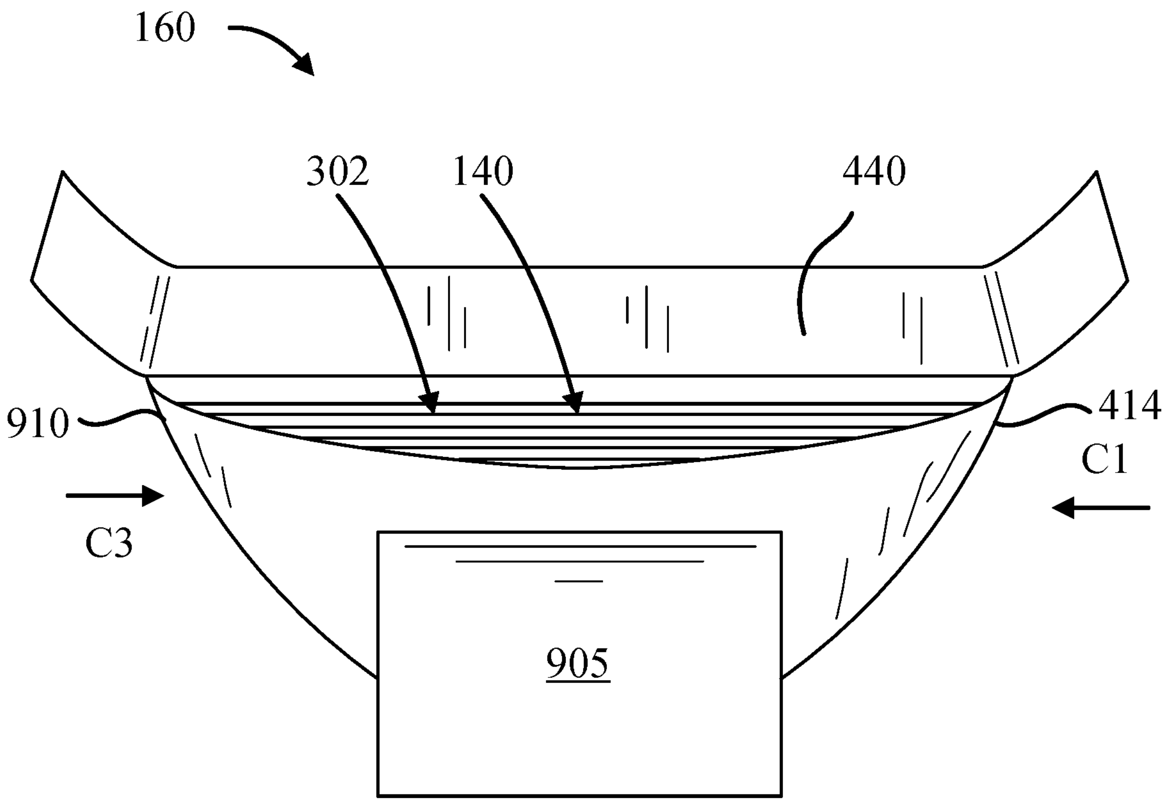
FIG. 10 illustrates a perspective view of a carrying bag during a transition step between the shipping configuration and a loading configuration, in accordance with various embodiments.

Referring now to FIG. 10, the carrying bag 160 during a transition from the shipping configuration 900 from FIG. 9 to a loading configuration is illustrated, with like numerals depicting like elements, in accordance with various embodiments. To complete a transition to a loading configuration, the end user can apply compressive forces laterally to edges 414, 910 as shown with compressive forces C1, C3. In response to the compressive forces C1, C3, the carrying bag 160 opens and the partition assembly 140 transitions from a flattened configuration 302 to a loading configuration 1100 as shown in FIG. 11.

Figure 11:
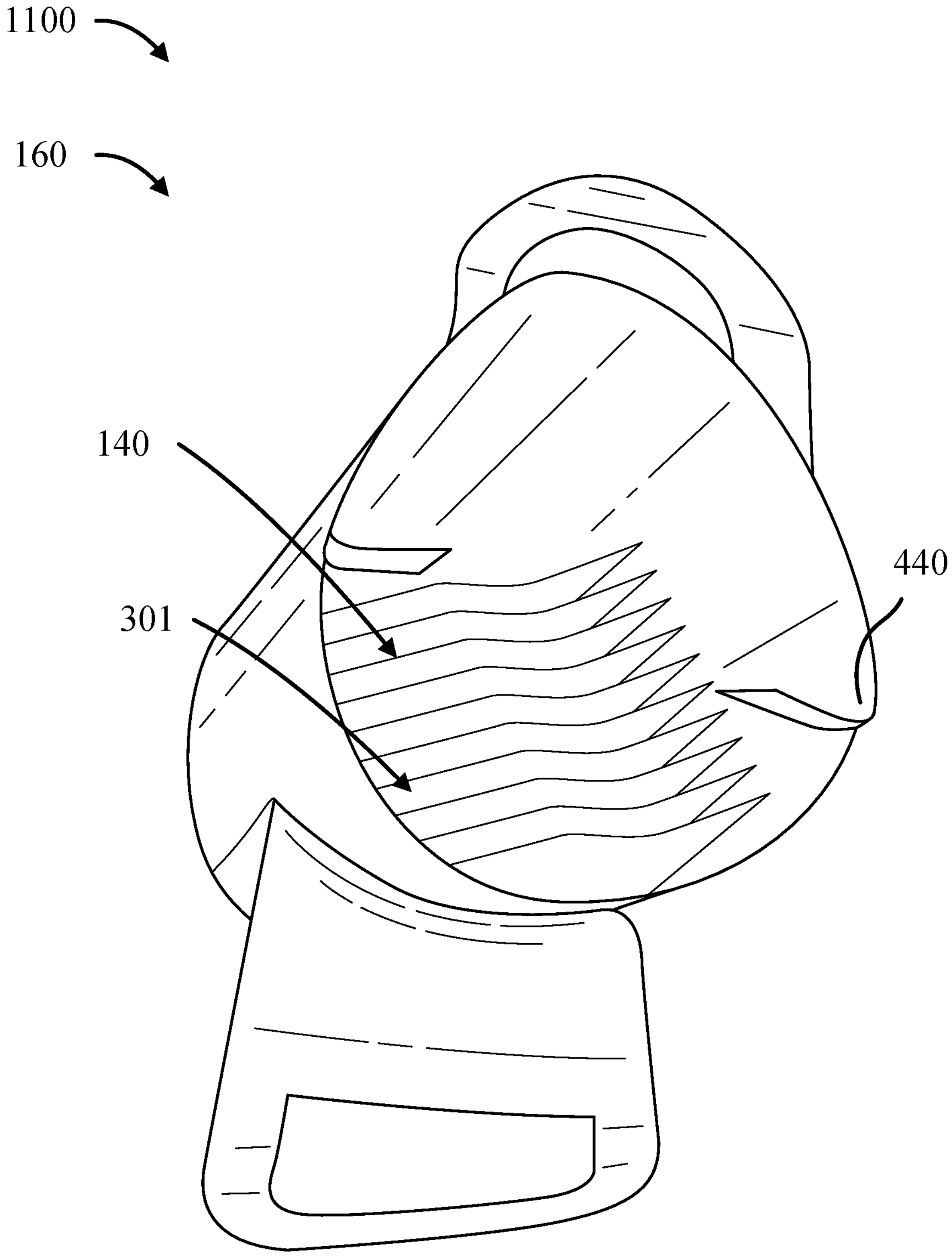
FIG. 11 illustrates a perspective view of a carrying bag in a loading configuration, in accordance with various embodiments.

With reference now to FIG. 11, in the loading configuration 1100, the partition assembly 140 is configured to receive a plurality of cassettes 120 as described previously herein. In this regard, transitioning from the shipping configuration 900 in FIG. 9 to the loading configuration 1100 in FIG. 11 is fast and easy, and loading can begin as soon as the carrying bag 160 is in the loading configuration 1100. In this regard, there are no extra external components shipped with the carrying bag 160 that have to be added to the carrying bag 160 prior to loading various cassettes 120. As such, shipping of the carrying bag 160 from a manufacturer to an end user is greatly simplified relative to typical carrying bags for use in cryogenic transport assemblies 100, in accordance with various embodiments.

In various embodiments, the carrying bag 160 is configured for various types of cassettes 120 from FIG. 1A. For example, the carrying bag 160 is configured to carry envelopes in accordance with envelope 1200 illustrated in FIGS. 12A-C, envelopes in accordance with the envelope 1300 illustrated in FIGS. 13A-13C, and metal cassettes in accordance with FIG. 14 as described further herein.

Figure 12A:
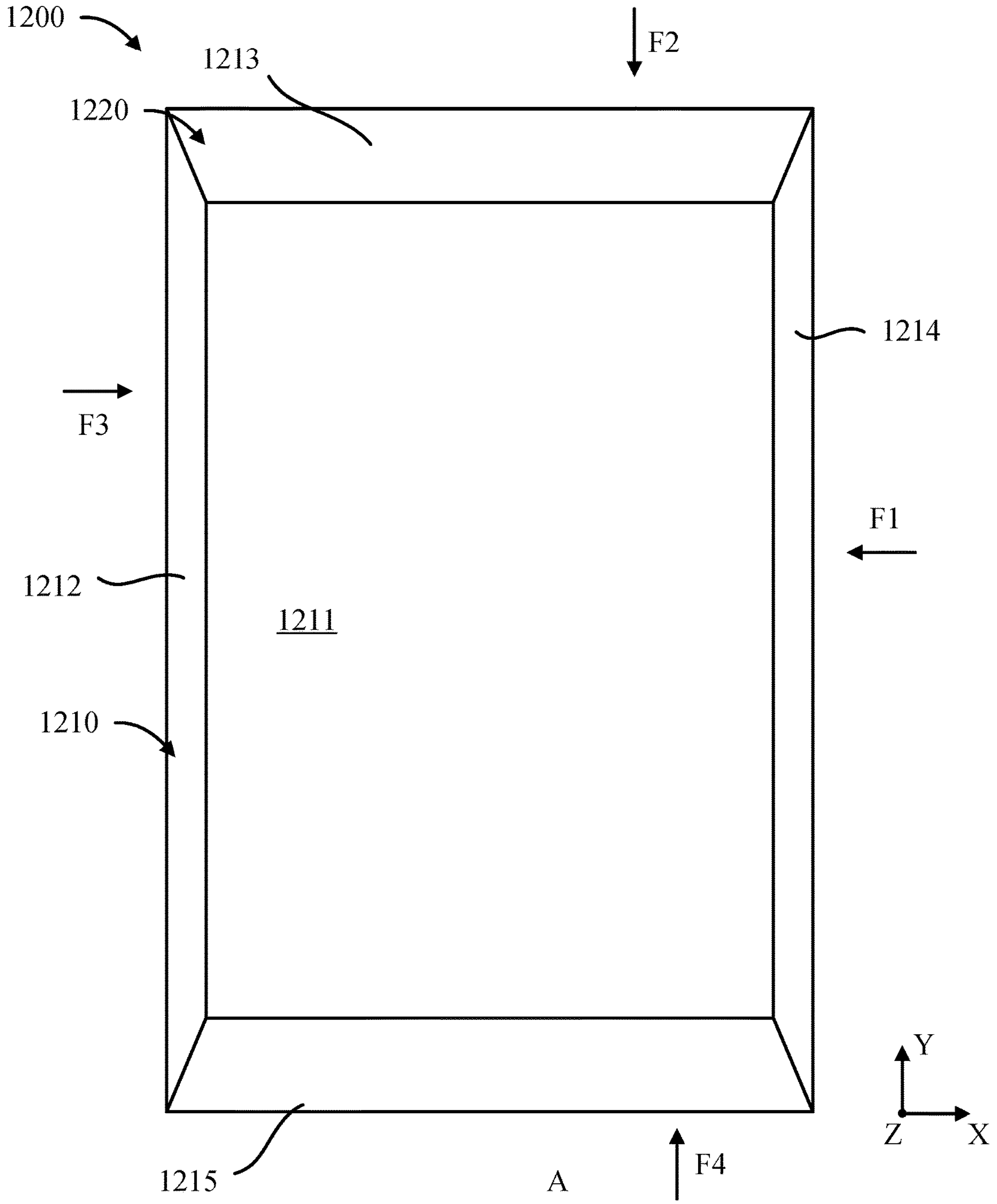
FIG. 12A illustrates a front view of an envelope for use in a cryogenic articles transport assembly, in accordance with various embodiments.

Referring now to FIG. 12A, a front planar view of the envelope 1200 is illustrated in connection with X-Y-Z axes and in accordance with various embodiments. The envelope 1200 may be utilized in a cryogenic articles transport assembly 100 from FIG. 1A as a cassette bag in the plurality of cassettes 120. The envelope 1200 may be made of a polymeric material configured to withstand cryogenic temperatures without shattering or breaking. The envelope may hold, enclose, and protect different sizes of blood bags, such as a 50-ml blood bag, a 250-ml blood bag, and/or a 500-ml blood bag, or the like. In various embodiments, the envelope 1200 is a monolithic component (e.g., formed of a single piece of material), as described further herein. In this regard, the envelope 1200 may reduce a part count for blood bag envelopes, which typically utilize several components to properly hold, enclose, and protect blood bags, in accordance with various embodiments.

The envelope 1200 comprises a front panel 1210. The front panel 1210 comprises an inner front panel 1211, and front side panels 1212, 1213, 1214, 1215, and more specifically, a first front side panel 1212, an upper front side panel 1213, a second front side panel 1214 opposite the first front side panel 1212, and a lower front side panel 1215 opposite the upper front side panel 1213. The front side panels 1212, 1213, 1214, 1215 surround, and define a perimeter of, the inner front panel 1211. The front side panels 1212, 1213, 1214, 1215 partially define a crumple zone 1220. The crumple zone 1220 defines a perimeter around the inner front panel 1211. In this regard, the crumple zone 1220 is configured to dampen any forces (e.g., F1, F2, F3, F4) exposed to a side of the envelope 1200 during transportation of the envelope 1200 via cryogenic articles transport assembly 100 from FIG. 1A. In this regard, the crumple zone 1220 is configured to protect a blood bag (e.g., a blood bag in the plurality of blood bags 130 from FIG. 1A) in response to side impact (e.g., a force in the X-Y plane).

Figure 12B:
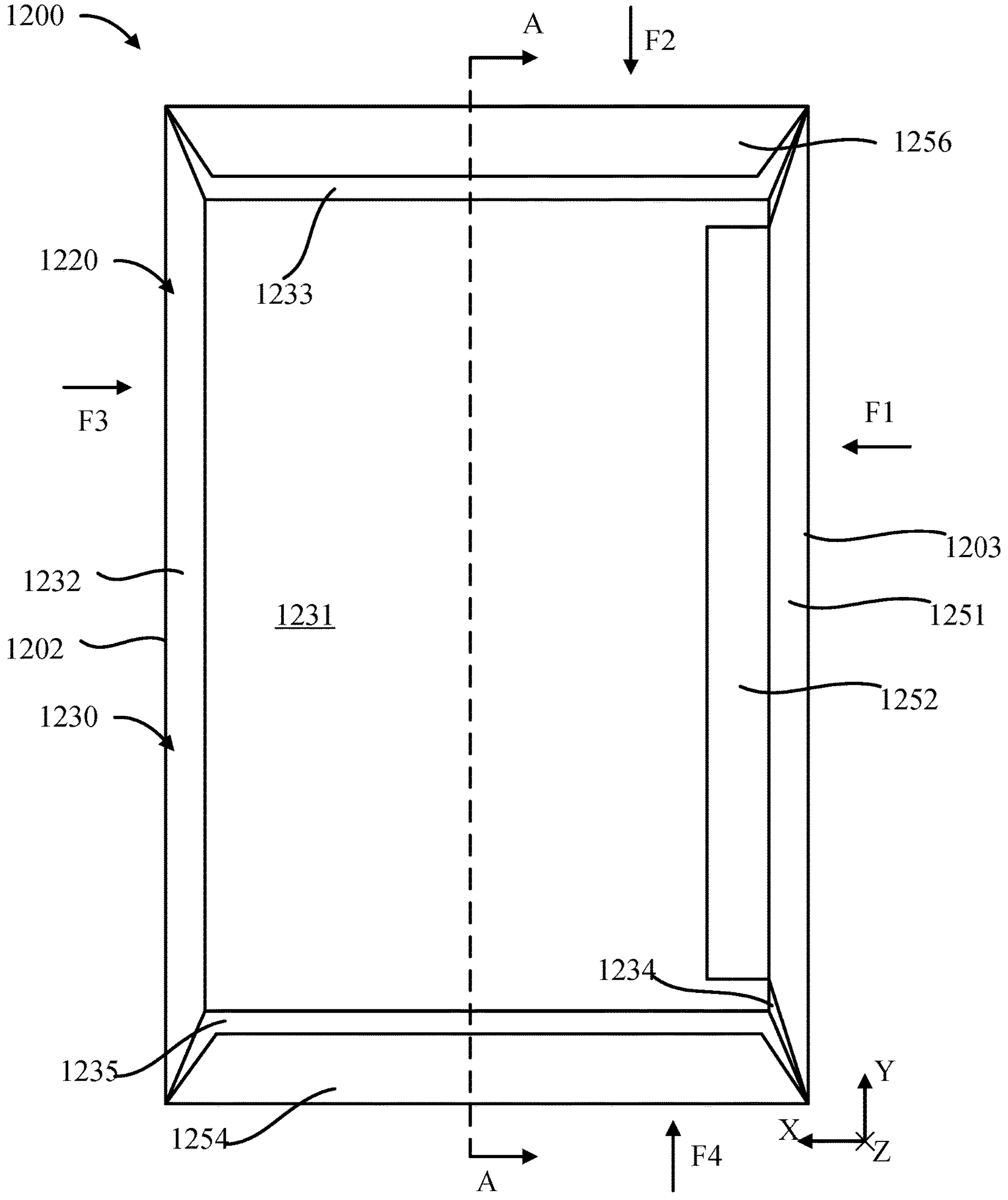
FIG. 12B illustrates a back view of an envelope for use in a cryogenic articles transport assembly, in accordance with various embodiments.

Referring now to FIG. 12B, a back planar view of the envelope 1200 from FIG. 12A is illustrated, in accordance with various embodiments. The envelope 1200 further comprises a back panel 1230. The back panel 1230 comprises an inner back panel 1231, and back side panels 1232, 1233, 1234, 1235 (specifically, a first back side panel 1232, an upper back side panel 1233, a second back side panel 1234 opposite the first back side panel 1232, and a lower back side panel 1265 opposite the upper back side panel 1233). The back side panels 1232, 1233, 1234, 1235 surround, and define a perimeter of, the inner back panel 1231. The back side panels 1232, 1233, 1234, 1235 partially define the crumple zone 1220. The crumple zone 1220 also defines a perimeter around the back panel 1230. In various embodiments, a blood bag 130 from FIG. 1A is disposed in a thickness direction of the envelope 1200 (e.g., in the Z-direction) between the inner back panel 1231 and the inner front panel 1211 from FIG. 12A.

In this regard, the crumple zone 1220 is configured to dampen any forces (e.g., F1, F2, F3, F4) exposed to a side of the envelope 1200 during transportation of the envelope 1200 via cryogenic articles transport assembly 100 from FIG. 1A. In this regard, the crumple zone 1220 is configured to protect a blood bag (e.g., a blood bag in the plurality of blood bags 130 from FIG. 1A) in response to side impact to the envelope 1200.

The envelope 1200 further comprises outer edge panels 1252, 1254, 1256 (specifically a side outer edge panel 1252, a lower outer edge panel 1254, and an upper outer edge panel 1256 disposed opposite the lower outer edge panel 1254). The outer edge panels 1252, 1254, 1256 are configured to seal an internal cavity of the envelope 1200 as described further herein. The outer edge panels 1252, 1254, 1256 are disposed on three of the four sides of back panel 1230. In this regard, a crease 1202 between the back side panel 1232 of the back panel 1230 and front side panel 1212 (FIG. 12A) of the front panel 1210 (FIG. 12A) seals a fourth side of the cavity of the envelope 1200 from an external environment as described further herein.

In various embodiments, a portion 1251 of the side outer edge panel 1252 may form a portion of the crumple zone 1220 (FIG. 12A). Although illustrated as comprising a shape slightly different from the back side panel 1234, the present disclosure is not limited in this regard. For example, the portion 1251 of the side outer edge panel 1252 may have a similar shape to the back side panel 1234 to facilitate folding and ease of manufacture as described further herein.

In various embodiments, each outer edge panel (e.g., outer edge panels 1252, 1254, 1256), is coupled to an adjacent side panel (e.g., back side panel 1233 for lower outer edge panel 1254, back side panel 1234 for side outer edge panel 1252, and back side panel 1235 for lower outer edge panel 1254). For example, an adhesive may be disposed between each outer edge panel and the adjacent side panel to facilitate coupling of the adjacent panels and to facilitate sealing of a cavity of the envelope 1200 from an external environment.

Figure 12C:
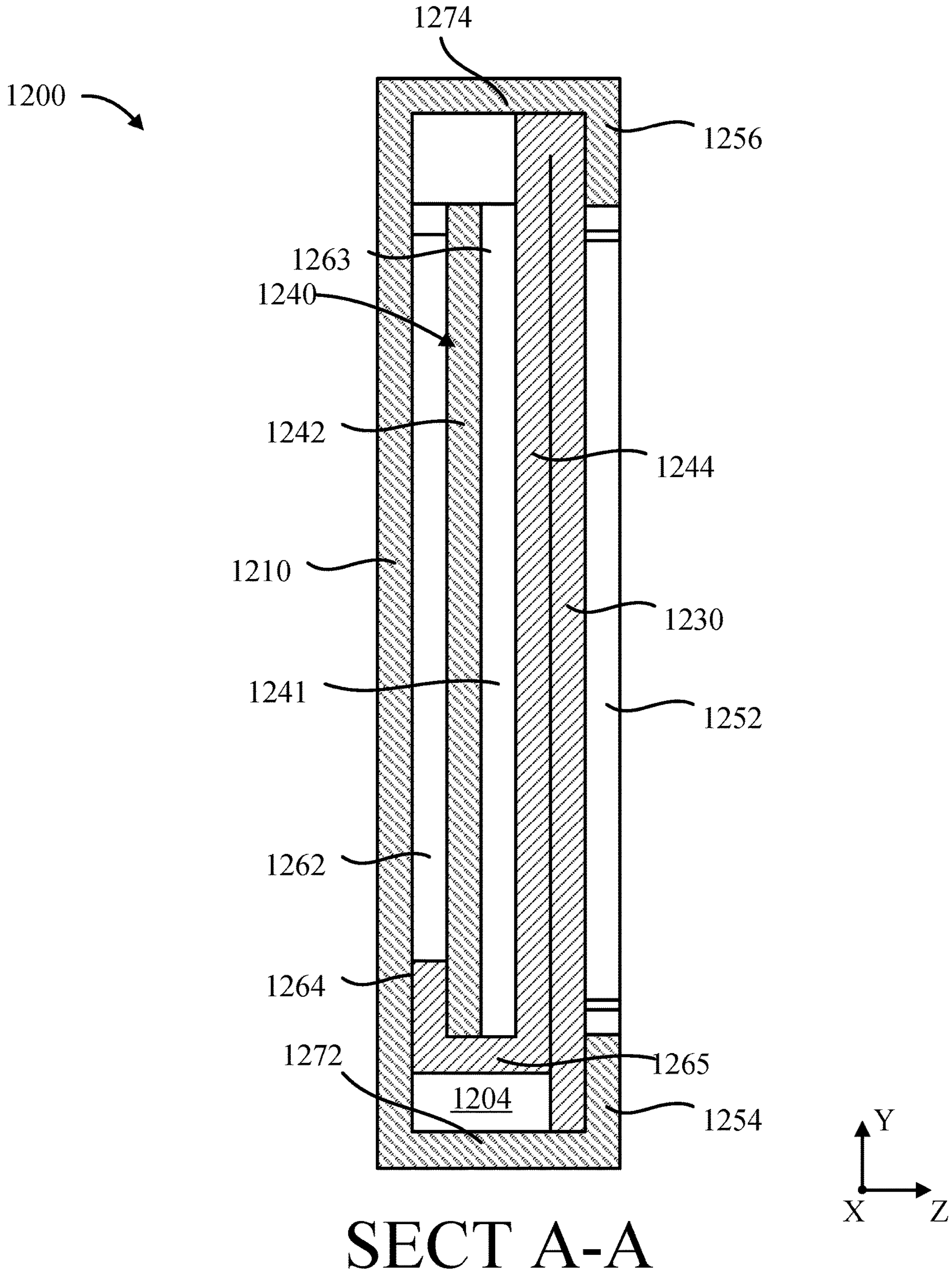
FIG. 12C illustrates a cross-sectional view of an envelope for use in a cryogenic articles transport assembly, in accordance with various embodiments.

Referring now to FIG. 12C, a cross-sectional view of the envelope 1200 along section line B-B from FIG. 12B is illustrated, with like numerals depicting like elements, in accordance with various embodiments. One skilled in the art may recognize that the cross-section is not to scale and is illustrated in a manner to clarify structural relationships between various components of the envelope 1200. For example, a bottom crease 1272 between front panel 1210 and lower outer edge panel 1254 is shown having a relatively large thickness (e.g., in the Z-direction) when in various embodiments, layers in the z direction would be pressed together tightly at outer edges, forming an at least partially curved shape or a bow shape around a blood bag disposed in an inner pouch 1240 of the envelope 1200.

In various embodiments, the envelope 1200 further comprises the inner pouch 1240 defined at least partially by a pouch front panel 1242, a pouch back panel 1244, and a crease 1265. The inner pouch 1240 defines a blind pouch 1241 configured to receive a blood bag 130 for use in a cryogenic articles transport assembly 100 from FIG. 1A. In this regard, a blood bag 130 from FIG. 1A is configured to be disposed within the blind pouch 1241, providing multiple layers of protection for the blood bag 130 from FIG. 1A during transport of the blood bag. In various embodiments, the blind pouch 1241 is sealed on a first side by a first inner edge panel 1262 which wraps around the pouch front panel 1242, from pouch back panel 1244 forming a crease 1263. Similarly, the blind pouch 1241 is sealed on a second side by a second inner edge panel 1264 which wraps around a bottom portion of the pouch front panel 1242. In various embodiments, the first inner edge panel 1262 and the second inner edge panel are coupled to a front side of the front pouch panel (e.g., via an adhesive, a tape, or the like).

Similar to the formation of the blind pouch 1241, a cavity 1204 is defined in a thickness direction (e.g., in a Z-direction) between the front panel 1210 and the back panel 1230. The cavity 1204 is defined vertically between a bottom crease 1272 and a top crease 1274. The bottom crease 1272 is defined by a fold between the front panel 1210 and the lower outer edge panel 1254. Similarly, the top crease 1274 is defined by a fold between the front panel 1210 and the upper outer edge panel 1256. The cavity 1204 is further defined in the lateral direction (e.g., the X-direction) between the crease 1202 from FIG. 12B and a crease 1203 from FIG. 12B. The crease 1203 from FIG. 12B is defined by a fold between the front panel 1210 and the side outer edge panel 1252 from FIG. 12B. Thus, the blind pouch 1241 is disposed entirely within the cavity 1204.

Figure 13A:
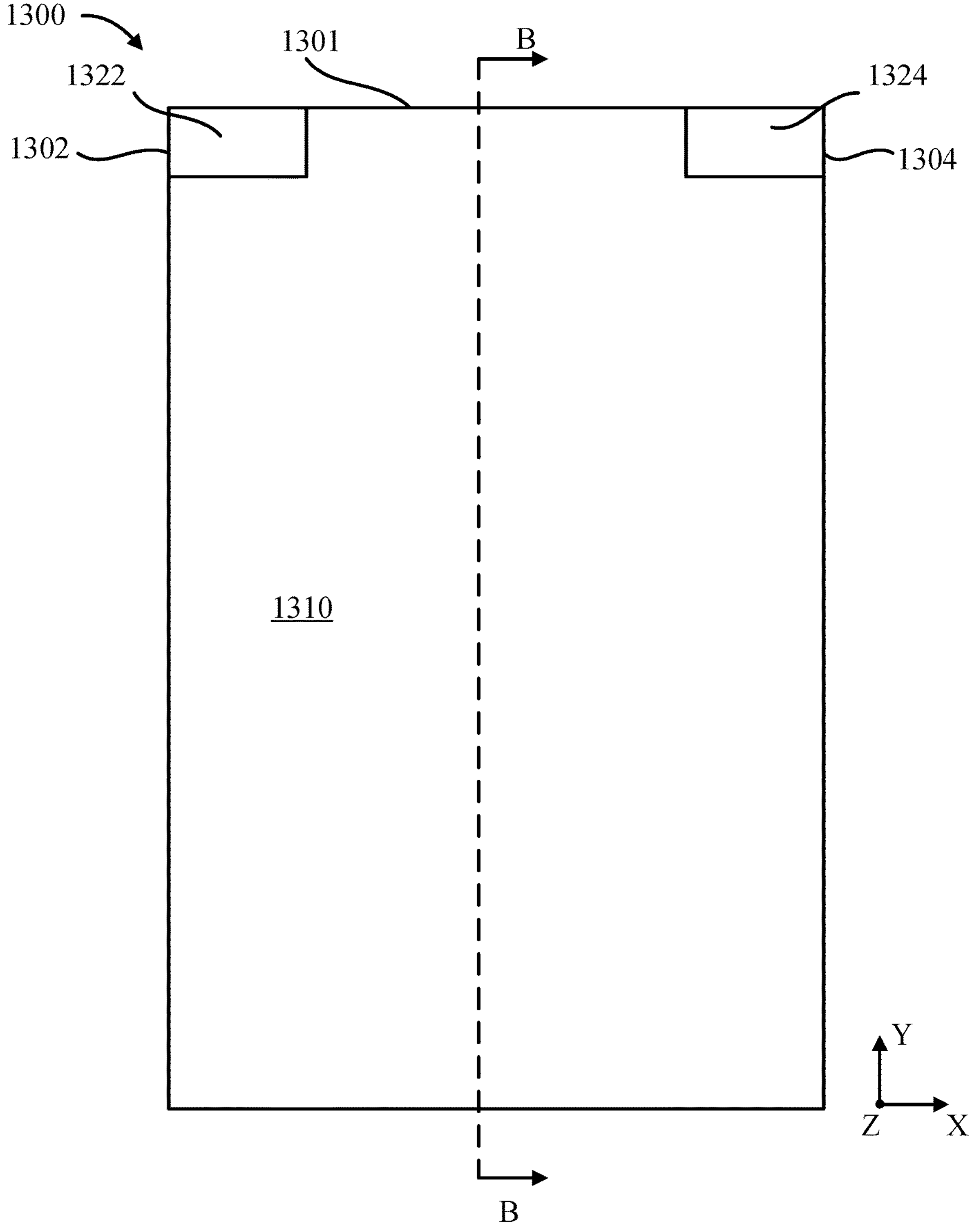
FIG. 13A illustrates a front view of an envelope for use in a cryogenic articles transport assembly, in accordance with various embodiments.

Referring now to FIG. 13A, a front planar view of an envelope 1300 is illustrated in accordance with various embodiments. The envelope 1300 may be utilized in a cryogenic articles transport assembly 100 from FIG. 1A in the plurality of cassettes 120. The envelope 1300 may be made of a polymeric material configured to withstand cryogenic temperatures without shattering or breaking. The envelope 1300 may hold, enclose, and protect different sizes of blood bags, such as a 50-ml blood bag, a 1250-ml blood bag, and/or a 500-ml blood bag, or the like. In various embodiments, the envelope 1300 is a monolithic component (e.g., formed of a single piece of material), as described further herein. In this regard, the envelope 1300 may reduce a part count for blood bag envelopes, which typically utilize several components to properly hold, enclose, and protect blood bags, in accordance with various embodiments.

Figure 13B:
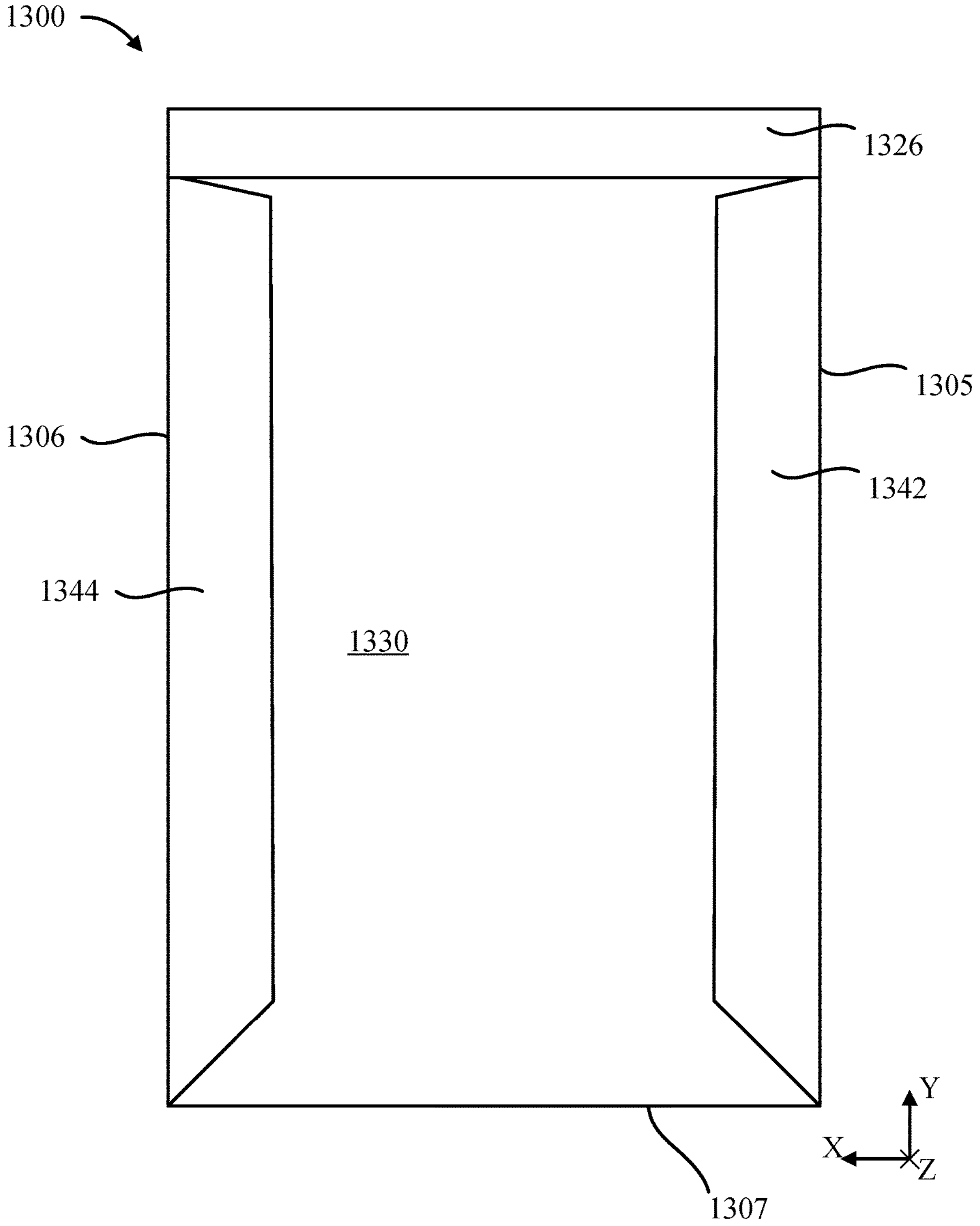
FIG. 13B illustrates a back view of an envelope for use in a cryogenic articles transport assembly, in accordance with various embodiments.

The envelope 1300 comprises a front panel 1310. The front panel 1310 is coupled to a top edge main panel 1326 from FIG. 13B via top edge side panels 1322, 1324 as described further herein. The top edge main panel 1326 from FIG. 13B and the front panel 1310 define a top crease 1301. Similarly, the top edge main panel 1326 and the top edge side panel 1322 define a crease 1302 sealing a side of the envelope 1300, and the top edge main panel 1326 and the top edge side panel 1324 define a second crease 1304 sealing a second side of the envelope 1300, the second side opposite the first side. Thus, the back panel 1330 from FIG. 13B is disposed between the top edge main panel 1326 and the front panel 1310, and the top edge main panel 1326 is configured to seal an opening defined between the front panel 1310 and the back panel 1330 from FIG. 13B, in accordance with various embodiments. Similarly, the front panel 1310 and the back panel 1330 are disposed between the top edge main panel 1326 and the top edge side panels 1322, 1324 for a portion of each side further sealing the opening defined between the back panel 1330 and the front panel 1310.

Referring now to FIG. 13B, a back planar view of the envelope 1300 from FIG. 13A is illustrated, in accordance with various embodiments. The envelope 1300 further comprises outer side edge panels 1342, 1344. The outer side edge panel 1342 and the front panel 1310 from FIG. 13A define a crease 1305. Similarly, the outer side edge panel 1344 and the front panel 1310 from FIG. 13A define a crease 1306. The outer side edge panel 1342 is coupled to the back panel 1330 by any method, such as via an adhesive, tape, or the like. Similarly, the outer side edge panel 1344 is coupled to the back panel 1330. In this regard, the crease 1305 seals a first side between the front panel 1310 and the back panel 1330, and the crease 1306 seals a second side between the front panel 1310 and the back panel 1330, in accordance with various embodiments. In various embodiments, the front panel 1310 and the back panel 1330 from FIG. 13B define a bottom crease 1307.

Figure 13C:
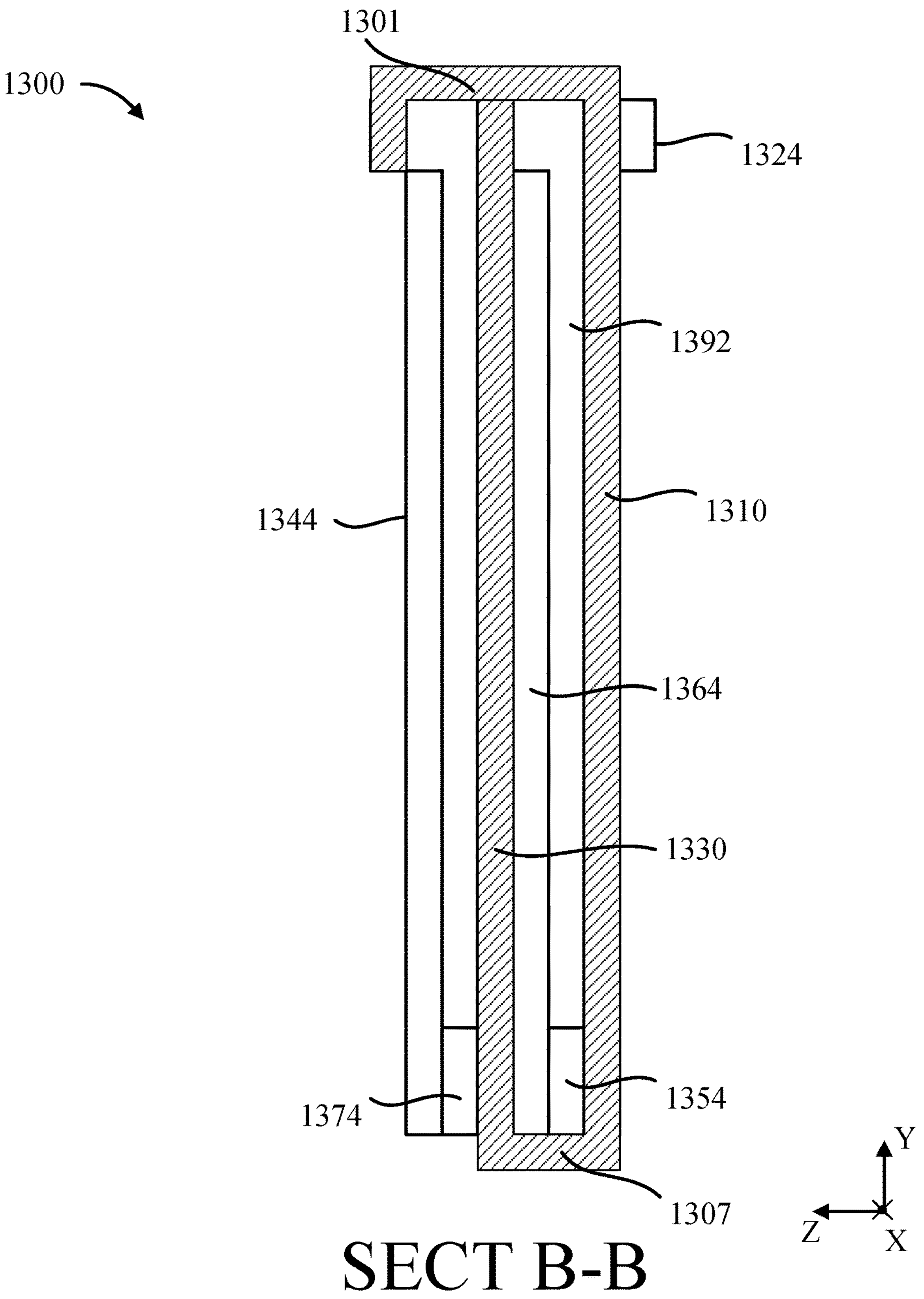
FIG. 13C illustrates a cross-sectional view of an envelope for use in a cryogenic articles transport assembly, in accordance with various embodiments.

Referring now to FIG. 13C, a cross-sectional view along section line C-C with like numerals depicting like elements, is illustrated in accordance with various embodiments. One skilled in the art may recognize that the envelope is mirrored about the cross sectional line C-C. Thus, a cross-section facing towards the side having top edge side panel 1322 and outer side edge panel 1342 would correspond to section C-C illustrated in FIG. 13C. In various embodiments, the envelope 1300 comprises a cavity 1392 defined in a thickness direction (e.g., the Z-direction) between the front panel 1310 and the back panel 1330. In various embodiments, the cavity 1392 is defined in a vertical direction (e.g., the Y-direction) between the bottom crease 1307 and the top crease 1301.

In various embodiments, the envelope further comprises an inner side edge panel 1364. The inner side edge panel 1364 is folded inward from the back panel 1330 as described further herein and configured to mate with an internal surface of the front panel 1310. In this regard, the envelope 1300 may comprise redundant sealing on the sides of the envelope from the inner side edge panel 1364 and the crease 1306 formed between outer side edge panel 1344 and the front panel 1310.

Thus, in various embodiments, the cavity 1392 is defined in a lateral direction (e.g., the X-direction) between opposite inner edge panels (e.g., inner side edge panel 1364 and an inner edge panel disposed on the laterally opposite side), in accordance with various embodiments. The cavity 1392 is configured to receive a blood bag 130 from FIG. 1A for use in cryogenic articles transport assembly 100, in accordance with various embodiments.

In various embodiments, the envelope 1300 further comprises corner panels 1354, 1374. The corner panels 1354, 1374 further facilitate folding of the side edge panels 1344, 1364. For example, corner panel 1374 wraps around inner side edge panel 1364 and back panel 1330 and is directly coupled to the corner panel 1354 by a crease.

Figure 14:
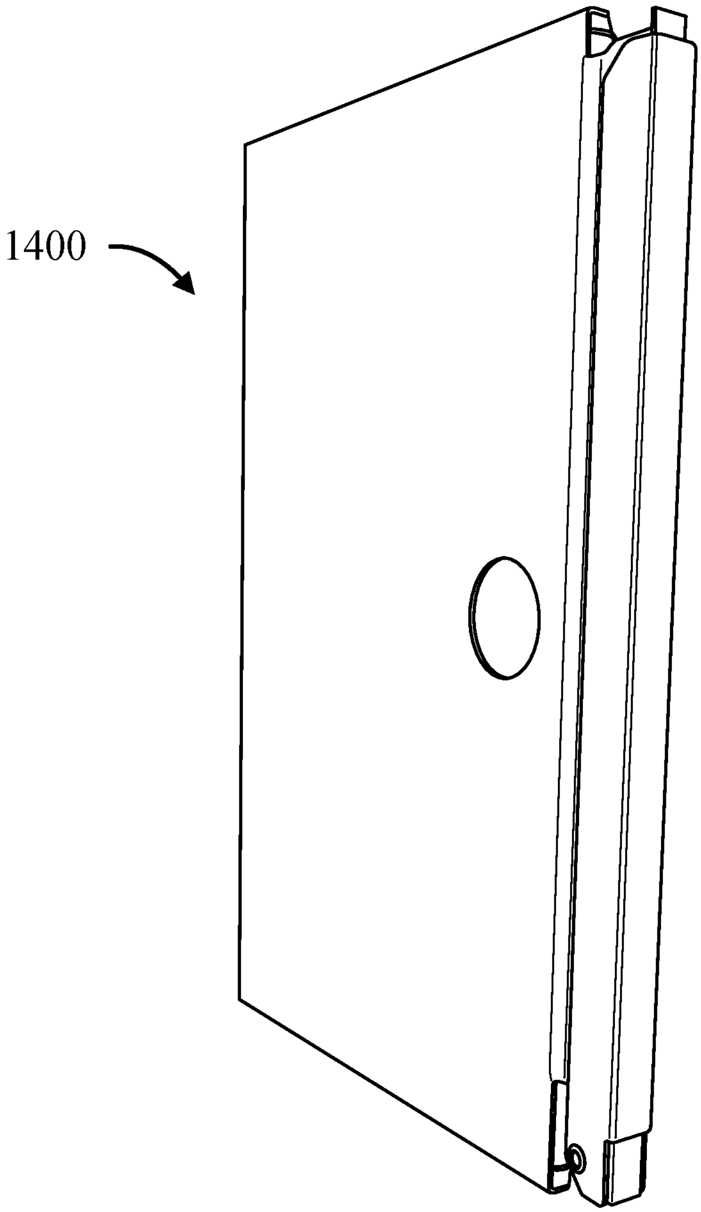
FIG. 14 illustrates a perspective view of a metal cassette for use in a cryogenic articles transport assembly, in accordance with various embodiments.

Referring now to FIGS. 1A and 14, each cassette bag in the plurality of cassettes 120 of FIG. 1A can be any other type of cassette bag known for transporting articles in cryogenic temperatures. For example, the cassette bags in the plurality of cassettes 120 can comprise a metal cassette in accordance with the metal cassette 1400 in FIG. 14. Metal cassettes are known in the art to provide protection to blood bags during transit; however, the metal cassette 1400 is more rigid relative to the envelopes 1200, 1300 described previously herein and also adds greater weight to the cryogenic transport assembly 100 from FIG. 1A. In this regard, the damping component 710 from FIG. 8 could be made thicker to accommodate greater impact forces during transport relative to the envelopes 1300, 1400, in accordance with various embodiments.

Figure 15:
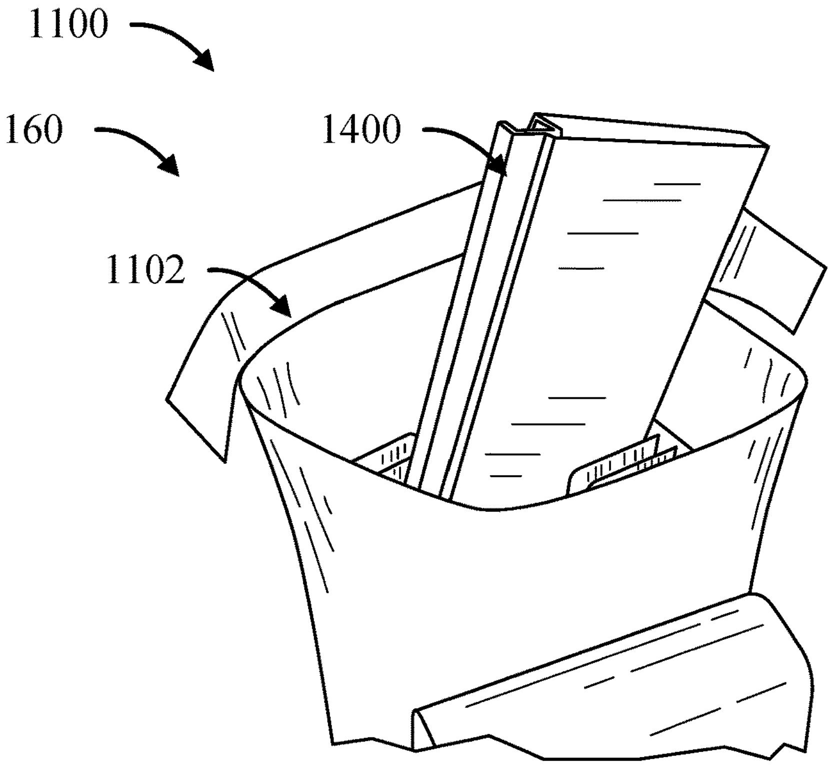
FIG. 15 illustrates a portion of a carrying bag in a loading configuration during loading of a metal cassette, in accordance with various embodiments.
Figure 16:
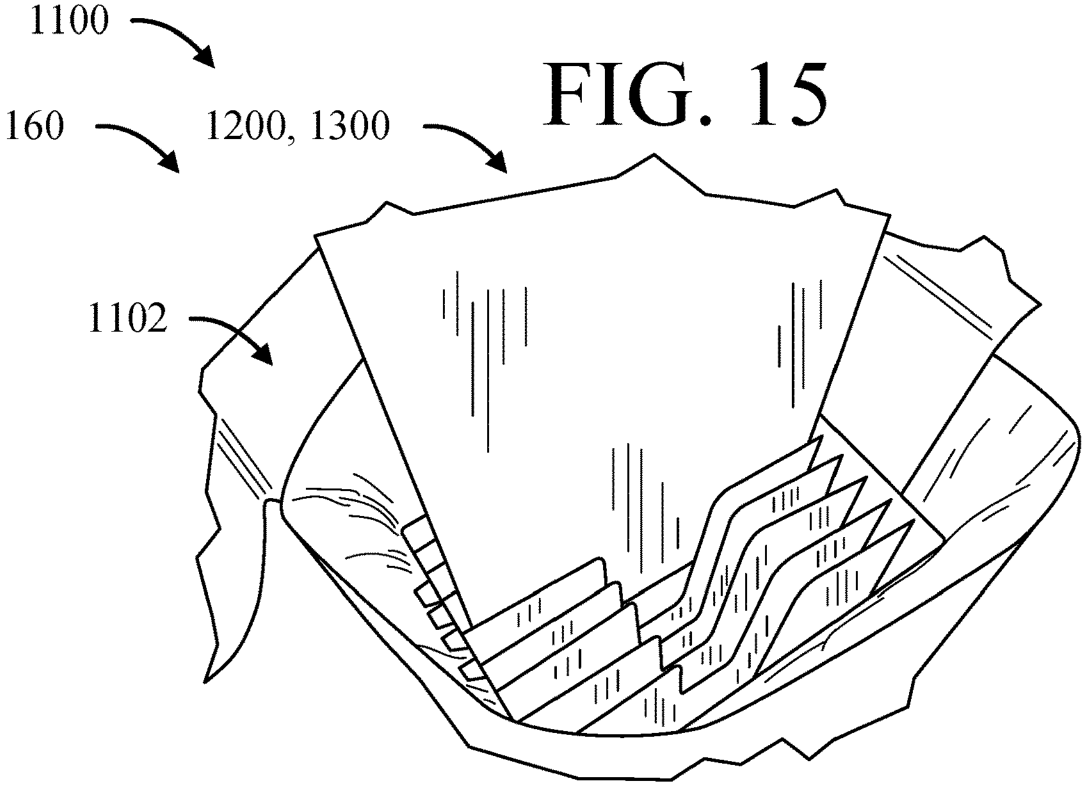
FIG. 16 illustrates a portion of a carrying bag in a loading configuration during loading of an envelope, in accordance with various embodiments.
Figure 17:
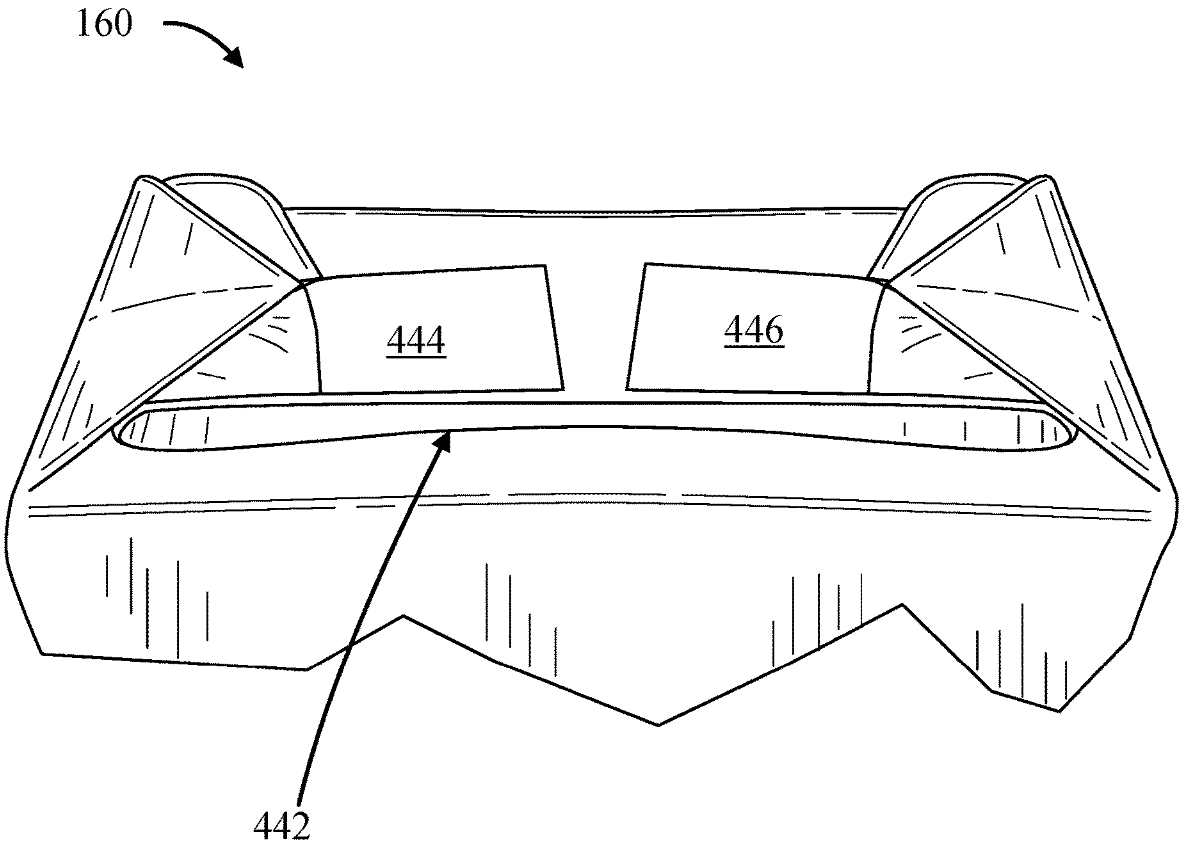
FIG. 17 illustrates a top portion of the carrying bag in a sealed configuration after loading of the carrying bag.

Referring now to FIG. 15, a perspective view of the carrying bag 160 in a loading configuration 1100 from FIG. 11 during loading of a metal cassette 1400 from FIG. 14. Similarly, with reference now to FIG. 16, a perspective view of the carrying bag 160 in a loading configuration 1100 from FIG. 11 during loading of an envelope 1200 (or 1300 from FIGS. 12A-C (or FIGS. 13A-C) is illustrated in accordance with various embodiments. As shown in FIGS. 15, 16, loading of the carrying bag 160 is easy and efficient relative to loading of typical carrying systems for cryogenic articles (such as blood bags), in accordance with various embodiments. For example, after transitioning to the loading configuration 1100, cassettes 120 can immediately be loaded within the carrying bag 160.

Referring now to FIGS. 4A, 11, 15, 16, and 17, after the carrying bag 160 is loaded with the cassettes 120 as described previously herein, the top portion 412 of the main body 410 can be folded to close an opening 1102 of the carrying bag 160. In this regard, the top portion 412 of the main body 410 of the carrying bag 160 is configured to fold about the various scores 405 from FIG. 4A, facilitating a closing of the opening 1102. A protective layer can then be removed from the assembly seal 408 to allow an adhesive (e.g., a double sided tape or the like) to couple the top flap 440 to the top portion 412 of the main body 410. Upon coupling a main portion 442 of the top flap 440 to the top portion 412, edge flaps 444, 446 can be folded inward and over the main portion 442 to generate a more robust assembly seal as shown.

Figure 18:
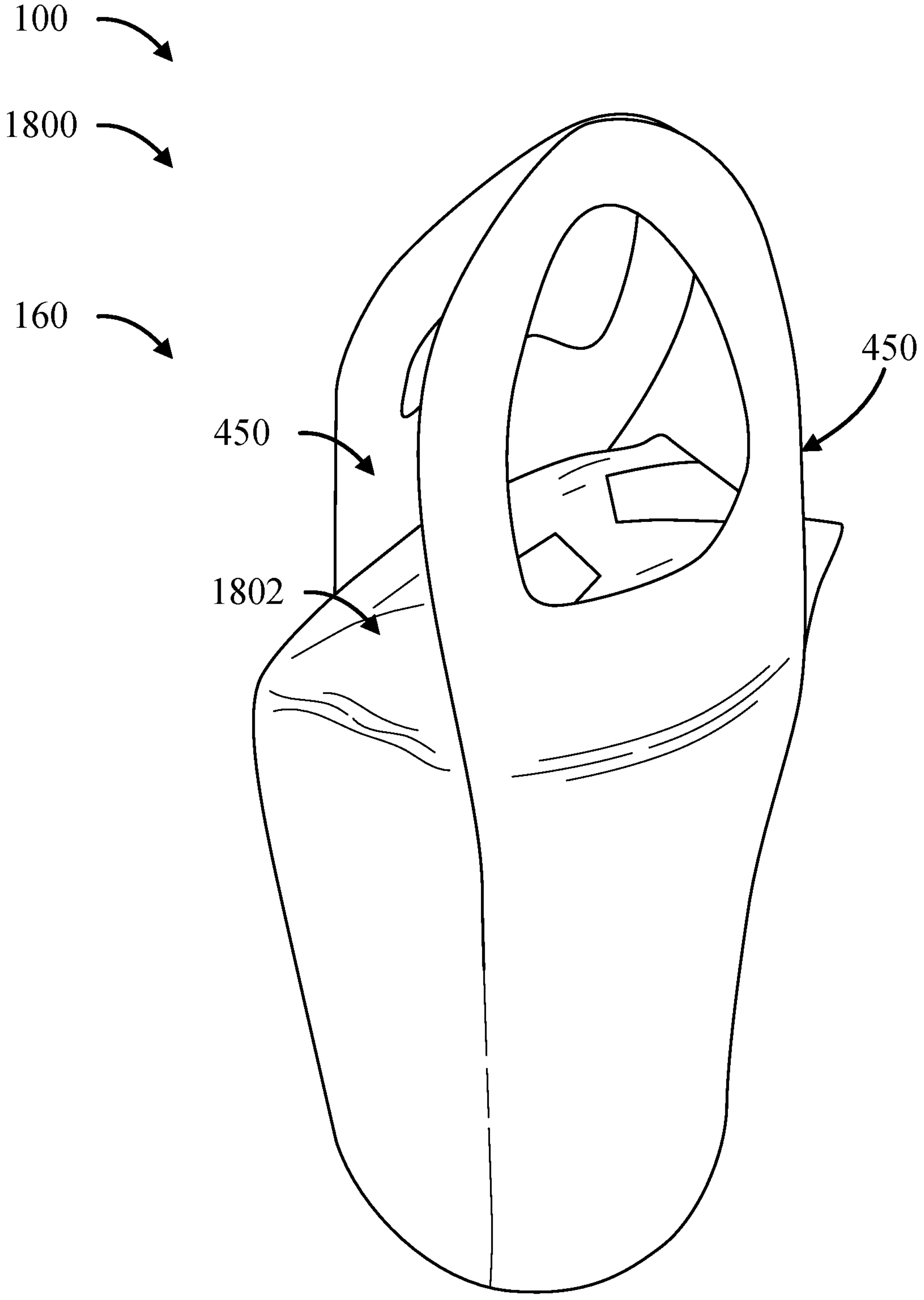
FIG. 18 illustrates a carrying bag prior to transporting biomaterials disposed therein, in accordance with various embodiments.

Referring now to FIG. 18, a cryogenic articles transport assembly 100 with the carrying bag 160 in a cryogenic articles transport configuration 1800 is illustrated, in accordance with various embodiments. In this regard, a cavity within the carrying bag 160 is entirely sealed with a plurality of cassettes 120 loaded therein, as described previously herein. The handles 450 can then be extended above a top sealed portion 1802 of the carrying bag for ease of transport.

Figure 19:
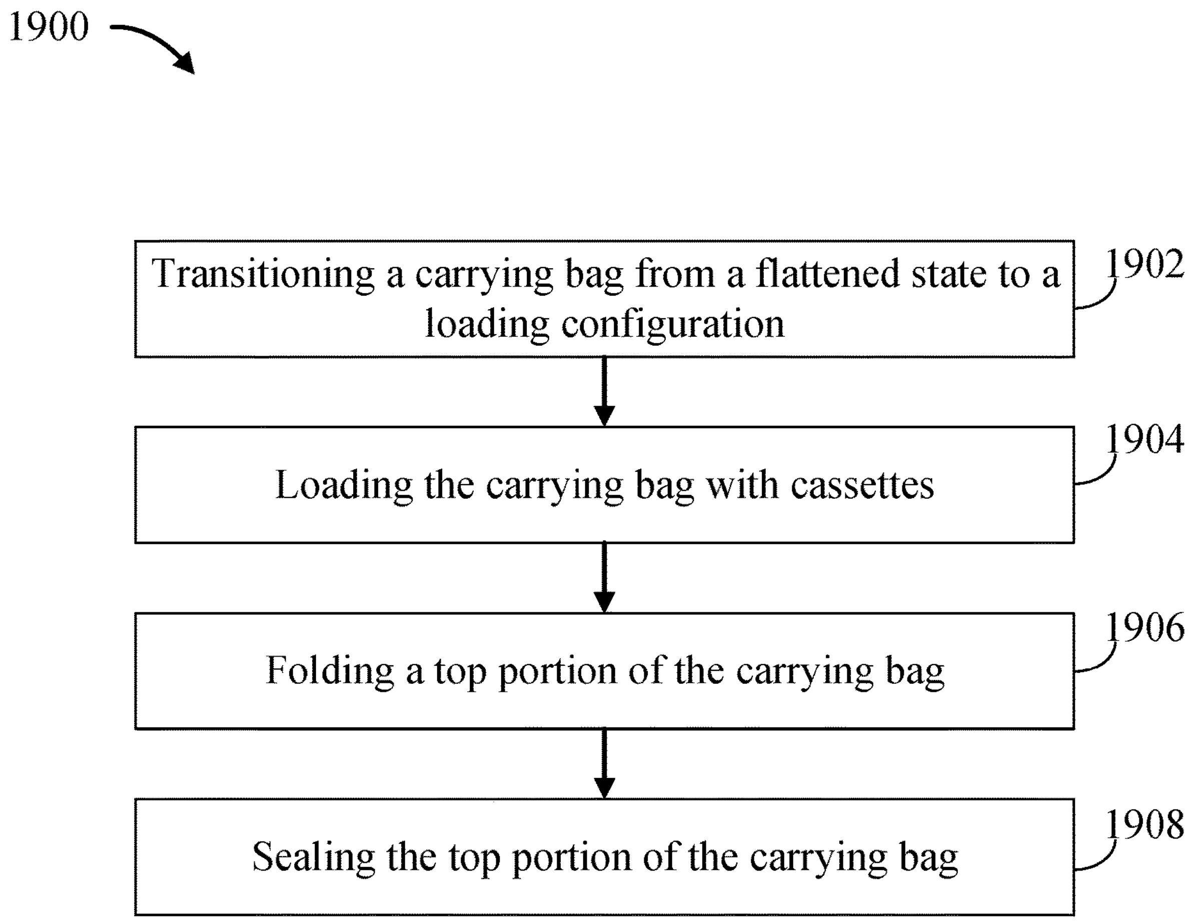
FIG. 19 illustrates a method for loading a carrying bag for transporting cryogenic articles, in accordance with various embodiments.

Referring now to FIG. 19, a method 1900 for loading a carrying bag (e.g., carrying bag 110 or carrying bag 160) for transporting cassettes having biomaterials disposed therein is illustrated, in accordance with various embodiments. The method 1900 comprises transitioning a carrying bag from a flattened state (e.g., as illustrated in the shipping configuration 900 of FIG. 9) to a loading configuration (e.g., the loading configuration 1100 from FIG. 11) (step 1902). In this regard, with brief reference to FIG. 10, compressive forces C1, C3 can be applied to opposite edges 910, 414, which causes an opening of the carrying bag 160 to open wider and the partition assembly 140 to transition from a flatted configuration 302 as shown in FIG. 3B to an extracted configuration 301 as shown n FIG. 3A. In this regard, in the loading configuration 1100 for the carrying bag 160, the cassettes 120 from FIG. 1A can easily be loaded therein, in accordance with various embodiments.

The method 1900 further comprises loading the carrying bag with the cassettes 120 (e.g., envelope 1200, envelope 1300, metal cassette 1400, or the like) (step 1904). In this regard, each cassette being loaded is disposed within a slot defined by the partition assembly 140 as shown in FIG. 3A.

The method 1900 further comprises folding a top portion 412 of the main body 400 of the carrying bag 160 to close an opening of the carrying bag 160 after loading the carrying bag in step 1904 (step 1906).

The method 1900 further comprises sealing the top portion 412 of the carrying bag 160 (step 1908). For example, a protective layer can be removed from the assembly seal 408 disposed on the top flap 440 from FIG. 4A. In this regard, the flap 440 can be folded over and joined to the top portion 412 of the carrying bag to seal the opening of the carrying bag 160 after loading. In various embodiments, edge flaps of the top flap 440 can further be folded inward and over a main portion of the top flap 440 to provide additional sealing of the opening of the carrying bag, in accordance with various embodiments.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A cryogenic articles transport assembly, comprising a partition assembly including a partition sleeve and a plurality of partitions coupled to the partition sleeve, the partition sleeve comprising a front panel, a back panel, a first side panel, and a second side panel;

a carrying bag including the partition assembly disposed therein, the carrying bag comprising:

a main body defining an outer sleeve and a top portion;

a base portion coupled to the main body via a plurality of tabs, the base portion comprising a rounded shape;

a first handle coupled to the main body; and a top flap extending from the top portion, the top flap including an assembly seal disposed thereon, the top portion configured to fold to close an opening in the top portion, the top flap configured to seal the opening in the top portion via the assembly seal, wherein:

the cryogenic articles transport assembly is configured to transition from a shipping configuration to a loading configuration, the shipping configuration including both the partition assembly and the carrying bag in a flattened state, the loading configuration including the opening and a set of slots in the partition assembly, and the outer sleeve comprises a rounded perimeter in the shipping configuration, in the loading configuration the partition assembly comprises:

the front panel, the back panel, the first side panel, and the second side panel at least partially define a perimeter of the partition sleeve, and the set of slots are disposed within the perimeter, each of the plurality of slots defined at least partially by the partition sleeve and at least one of the plurality of partitions.

2. The cryogenic articles transport assembly of claim 1, wherein the base portion includes a base sheet and an absorbent sheet, the plurality of tabs disposed between the base sheet and the absorbent sheet.

3. The cryogenic articles transport assembly of claim 2, wherein the plurality of tabs are coupled to the absorbent sheet via a first manufacturing seal, and wherein the plurality of tabs are coupled to the base sheet via a second manufacturing seal.

4. The cryogenic articles transport assembly of claim 3, wherein the absorbent sheet is coupled to the base sheet via a third manufacturing seal.

5. The cryogenic articles transport assembly of claim 1, wherein the assembly seal comprises a double sided tape having a first side coupled to the top flap and a second side coupled to a protective layer.

6. The cryogenic articles transport assembly of claim 1, further comprising a second handle coupled to the main body, the second handle disposed opposite the first handle.

7. The cryogenic articles transport assembly of claim 1, wherein the main body comprises a first plurality of scores on the top portion and a second plurality of scores on the base portion, and wherein the first plurality of scores are configured to facilitate closing of the opening after loading to transition from the loading configuration to a cryogenic transport configuration.

8. The cryogenic articles transport assembly of claim 7, wherein the second plurality of scores are configured to facilitate folding of the base portion to facilitate shipment of the carrying bag prior to loading by an end user.

9. The cryogenic articles transport assembly of claim 1, wherein the main body comprises an exterior layer made of a polymeric material, and wherein the main body comprises an absorbent layer disposed on at least a portion of an internal surface of the exterior layer.

10. The cryogenic articles transport assembly of claim 1, the cryogenic articles transport assembly further comprising:

the shipping configuration of the cryogenic articles transport assembly, the shipping configuration including the partition assembly disposed in the carrying bag, the carrying bag and the partition assembly in the flattened state; and the loading configuration of the cryogenic articles transport assembly, the loading configuration including the opening defined at the top portion of the carrying bag and the partition assembly in an extracted state, the extracted state of the partition assembly defining the plurality of slots within the partition assembly configured to receive a cassette with a biomaterial article.

11. The cryogenic articles transport assembly of claim 10, wherein the cryogenic articles transport assembly is configured to transition from the shipping configuration to the loading configuration in response to applying compressive forces to a first edge of the carrying bag and a second edge of the carrying bag, the first edge disposed on an opposite side as the second edge.

12. The cryogenic articles transport assembly of claim 10, wherein the cryogenic articles transport assembly is also configured to be in a cryogenic article transport configuration with a plurality of cassettes disposed in the carrying bag, the plurality of cassettes being one of a metal cassette or an envelope.

13. The cryogenic articles transport assembly of claim 10, wherein the base portion of the carrying bag further comprises a base sheet and an absorbent sheet, and wherein the plurality of tabs are disposed between the base sheet and the absorbent sheet coupling the base sheet and the absorbent sheet to the main body of the carrying bag.

14. The cryogenic articles transport assembly of claim 13, further comprising a damping component disposed adjacent to the absorbent sheet.

15. The cryogenic articles transport assembly of claim 1, wherein in the loading configuration, the partition sleeve comprises a generally rectangular cross-sectional shape.

16. A method of loading the cryogenic articles transport assembly of claim 10, the method comprising:

transitioning the carrying bag with the partition assembly disposed therein from the flattened state to the loading configuration, the loading configuration including the opening at the top portion of the carrying bag;

loading a plurality of cassettes in the carrying bag, each of the plurality of cassettes disposed in one of the plurality of slots defined by the partition assembly in the extracted state;

folding the top portion to close the opening; and sealing the top portion via the top flap extending from the top portion.

17. The method of claim 16, further comprising removing a protective layer from the assembly seal on the top flap prior to sealing the top portion via the top flap.

18. The method of claim 17, further comprising folding tabs of the top portion inward to further seal the top portion.

19. The method of claim 16, further comprising: pivoting a bottom portion of the carrying bag about scores defined by the main body of the carrying bag during transitioning of the carrying bag with the partition assembly from the flattened state to the loading configuration.

20. The method of claim 19, further comprising applying compressive forces to opposite sides of the carrying bag in the flattened state to initiate the transitioning from the flattened state to the loading configuration.

* * * * *